(12) United States Patent
Smith et al.

(10) Patent No.: US 9,939,650 B2
(45) Date of Patent: Apr. 10, 2018

(54) WEARABLE DISPLAY SYSTEM

(71) Applicant: Lockheed Martin Corporation, Bethesda, MD (US)

(72) Inventors: David A. Smith, Cary, NC (US); Patrick J. Goergen, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/058,739

(22) Filed: Mar. 2, 2016

(65) Prior Publication Data

US 2016/0259169 A1 Sep. 8, 2016

Related U.S. Application Data

(60) Provisional application No. 62/126,929, filed on Mar. 2, 2015.

(51) Int. Cl.
*H04N 9/47* (2006.01)
*G02B 27/02* (2006.01)
(Continued)

(52) U.S. Cl.
CPC ............ *G02B 27/028* (2013.01); *G02B 3/08* (2013.01); *G02B 27/0172* (2013.01);
(Continued)

(58) Field of Classification Search
CPC ..................... G02B 27/017; G02B 27/0172
(Continued)

(56) References Cited

U.S. PATENT DOCUMENTS

| 3,880,509 A | 4/1975 | Herndon |
| 4,026,641 A | 5/1977 | Bosserman et al. |

(Continued)

FOREIGN PATENT DOCUMENTS

| CA | 2750287 A1 | 11/2011 |
| CA | 2750287 C | 11/2011 |

(Continued)

OTHER PUBLICATIONS

Second Office Action for Mexican Patent Application No. MX/a/2013/004453, dated Jan. 19, 2017, 6 pages.
(Continued)

*Primary Examiner* — Audrey Y Chang
(74) *Attorney, Agent, or Firm* — Withrow & Terranova, PLLC

(57) ABSTRACT

A wearable display system has a first lens sub-assembly defining a first optical path and a second lens sub-assembly defining a second optical path. The first and second lens sub-assemblies are disposed in a frame in respective first and second lens-holding sub-assemblies. The frame also has a device holder configured to maintain a display of a device in the first and second optical paths. The display can be maintained within a predetermined range of distances and angles with respect to the first and second lens sub-assemblies. This arrangement permits the display, such as, for example, a smartphone display, independently to provide a specific image to each eye of a user. For example, different images can be independently provided to each eye from different portions of a common display, thereby enabling the user to perceive a three-dimensional image.

18 Claims, 12 Drawing Sheets

(51) Int. Cl.
   *H04N 13/04*   (2006.01)
   *G02B 3/08*   (2006.01)
   *G02C 11/00*   (2006.01)
   *G02B 27/22*   (2018.01)
   *G02B 27/01*   (2006.01)

(52) U.S. Cl.
   CPC .......... *G02B 27/2228* (2013.01); *G02C 11/10* (2013.01); *H04N 13/044* (2013.01); *G02B 2027/0136* (2013.01); *G02C 2202/20* (2013.01)

(58) Field of Classification Search
   USPC .................. 359/466, 474; 345/7, 8; 348/53; 349/57, 58
   See application file for complete search history.

(56) References Cited

U.S. PATENT DOCUMENTS

| | | | |
|---|---|---|---|
| 4,176,468 A | 12/1979 | Marty, Jr. | |
| 4,293,196 A | 10/1981 | Hilbert | |
| 4,406,532 A * | 9/1983 | Howlett | G03B 35/08 359/466 |
| H000423 H | 2/1988 | Mohon et al. | |
| 5,184,250 A | 2/1993 | Lacroix | |
| 5,253,116 A | 10/1993 | Lacroix | |
| 5,309,169 A | 5/1994 | Lippert | |
| 5,325,386 A | 6/1994 | Jewell et al. | |
| 5,347,400 A | 9/1994 | Hunter | |
| 5,388,990 A | 2/1995 | Beckman | |
| 5,436,763 A | 7/1995 | Chen et al. | |
| 5,561,538 A | 10/1996 | Kato et al. | |
| 5,572,343 A | 11/1996 | Okamura et al. | |
| 5,581,271 A | 12/1996 | Kraemer | |
| 5,641,288 A | 6/1997 | Zaenglein, Jr. | |
| 5,699,194 A | 12/1997 | Takahashi | |
| 5,701,132 A | 12/1997 | Kollin et al. | |
| 5,701,202 A | 12/1997 | Takahashi | |
| 5,712,649 A | 1/1998 | Tosaki | |
| 5,714,967 A * | 2/1998 | Okamura | G02B 27/017 345/8 |
| 5,715,094 A | 2/1998 | Ansley et al. | |
| 5,754,344 A | 5/1998 | Fujiyama | |
| 5,757,544 A | 5/1998 | Tabata et al. | |
| 5,774,268 A | 6/1998 | Takahashi | |
| 5,798,738 A | 8/1998 | Yamada | |
| 5,798,739 A | 8/1998 | Teitel | |
| 5,803,738 A | 9/1998 | Latham | |
| 5,834,676 A | 11/1998 | Elliott | |
| 5,844,530 A | 12/1998 | Tosaki | |
| 5,936,663 A | 8/1999 | Tabata et al. | |
| 5,982,343 A | 11/1999 | Iba et al. | |
| 5,999,147 A | 12/1999 | Teitel | |
| 6,038,387 A | 3/2000 | Machida | |
| 6,140,979 A | 10/2000 | Gerhard et al. | |
| 6,140,980 A | 10/2000 | Spitzer et al. | |
| 6,160,666 A | 12/2000 | Rallison et al. | |
| 6,185,045 B1 | 2/2001 | Hanano | |
| 6,201,646 B1 | 3/2001 | Togino et al. | |
| 6,215,593 B1 | 4/2001 | Bruce | |
| 6,266,194 B1 | 7/2001 | Tanijiri et al. | |
| 6,347,869 B1 | 2/2002 | Xu et al. | |
| 6,407,724 B2 | 6/2002 | Waldern et al. | |
| 6,445,362 B1 | 9/2002 | Tegreene | |
| 6,504,658 B1 | 1/2003 | Bignolles et al. | |
| 6,522,474 B2 | 2/2003 | Cobb et al. | |
| 6,529,331 B2 | 3/2003 | Massof et al. | |
| 6,549,332 B2 | 4/2003 | Kimura | |
| 6,611,253 B1 | 8/2003 | Cohen | |
| 6,633,304 B2 | 10/2003 | Anabuki et al. | |
| 6,646,811 B2 | 11/2003 | Inoguchi | |
| 6,704,128 B2 | 3/2004 | Takeyama et al. | |
| 6,731,434 B1 | 5/2004 | Hua et al. | |
| 6,751,026 B2 | 6/2004 | Tomono | |
| 6,771,423 B2 | 8/2004 | Geist | |
| 6,788,442 B1 | 9/2004 | Potin et al. | |
| 6,795,042 B1 | 9/2004 | Nagata et al. | |
| 6,813,085 B2 | 11/2004 | Richards | |
| 6,829,087 B2 | 12/2004 | Freese et al. | |
| 6,873,471 B2 | 3/2005 | Coates et al. | |
| 6,919,866 B2 | 7/2005 | Kanevsky et al. | |
| 6,919,867 B2 | 7/2005 | Sauer | |
| 6,963,379 B2 | 11/2005 | Tomono | |
| 7,002,551 B2 | 2/2006 | Azuma et al. | |
| 7,009,773 B2 | 3/2006 | Chaoulov et al. | |
| 7,016,116 B2 | 3/2006 | Dolgoff | |
| 7,063,256 B2 | 6/2006 | Anderson et al. | |
| 7,068,444 B2 | 6/2006 | Nishi | |
| 7,072,096 B2 | 7/2006 | Holman et al. | |
| 7,088,516 B2 | 8/2006 | Yagi et al. | |
| 7,095,562 B1 | 8/2006 | Peng et al. | |
| 7,110,013 B2 | 9/2006 | Ebersole et al. | |
| 7,119,965 B1 | 10/2006 | Rolland et al. | |
| 7,151,639 B2 | 12/2006 | Lung | |
| 7,295,377 B2 | 11/2007 | Edelmann | |
| 7,307,791 B2 | 12/2007 | Li et al. | |
| 7,324,081 B2 | 1/2008 | Friedrich et al. | |
| 7,339,742 B2 | 3/2008 | Amitai et al. | |
| 7,385,600 B2 | 6/2008 | Marion | |
| 7,391,573 B2 | 6/2008 | Amitai | |
| 7,407,106 B2 | 8/2008 | Yee et al. | |
| 7,432,879 B2 | 10/2008 | Schonlau | |
| 7,446,941 B2 | 11/2008 | Fukuda | |
| 7,499,217 B2 | 3/2009 | Cakmakci et al. | |
| 7,545,571 B2 | 6/2009 | Garoutte et al. | |
| 7,547,101 B2 * | 6/2009 | Fuziak, Jr. | G02B 27/0172 345/7 |
| 7,573,525 B2 | 8/2009 | Yamasaki | |
| 7,605,773 B2 | 10/2009 | Janssen | |
| 7,613,356 B2 | 11/2009 | Uchiyama et al. | |
| 7,623,294 B2 | 11/2009 | Harada et al. | |
| 7,626,562 B2 | 12/2009 | Iwasaki | |
| 7,663,793 B1 | 2/2010 | Doucet | |
| 7,732,694 B2 | 6/2010 | Rosenberg | |
| 7,751,122 B2 | 7/2010 | Amitai | |
| 7,765,083 B2 | 7/2010 | Zank et al. | |
| 7,804,507 B2 | 9/2010 | Yang et al. | |
| 7,812,815 B2 | 10/2010 | Banerjee et al. | |
| 7,843,403 B2 | 11/2010 | Spitzer | |
| 7,928,927 B1 | 4/2011 | Krenz et al. | |
| 7,949,295 B2 | 5/2011 | Kumar et al. | |
| 7,965,868 B2 | 6/2011 | Roberts et al. | |
| 8,046,719 B2 | 10/2011 | Skourup et al. | |
| 8,059,342 B2 | 11/2011 | Burke | |
| 8,320,217 B1 | 11/2012 | Barger et al. | |
| 8,625,200 B2 | 1/2014 | Smith et al. | |
| 8,678,282 B1 | 3/2014 | Black et al. | |
| 8,766,879 B2 | 7/2014 | Fujikawa et al. | |
| 8,781,794 B2 | 7/2014 | Harrison et al. | |
| 8,884,845 B2 * | 11/2014 | Yamazaki | G01C 21/365 345/8 |
| 8,928,558 B2 | 1/2015 | Lewis et al. | |
| 8,964,298 B2 | 2/2015 | Haddick et al. | |
| 9,384,594 B2 | 7/2016 | Maciocci et al. | |
| 9,551,873 B2 * | 1/2017 | Zalewski | G06F 3/01 |
| 2001/0033401 A1 | 10/2001 | Kasai et al. | |
| 2001/0043163 A1 | 11/2001 | Waldern et al. | |
| 2002/0036649 A1 | 3/2002 | Kim et al. | |
| 2002/0047987 A1 | 4/2002 | Massengill et al. | |
| 2002/0094189 A1 | 7/2002 | Navab et al. | |
| 2002/0163486 A1 | 11/2002 | Ronzani et al. | |
| 2002/0181115 A1 | 12/2002 | Massof et al. | |
| 2002/0186179 A1 | 12/2002 | Knowles | |
| 2002/0196554 A1 | 12/2002 | Cobb et al. | |
| 2003/0184868 A1 | 10/2003 | Geist | |
| 2004/0008157 A1 * | 1/2004 | Brubaker | G02B 27/0176 345/8 |
| 2004/0070839 A1 | 4/2004 | Yagi et al. | |
| 2004/0130783 A1 | 7/2004 | Solomon | |
| 2004/0174599 A1 | 9/2004 | Dietrich | |
| 2005/0046953 A1 | 3/2005 | Repetto et al. | |
| 2006/0072215 A1 | 4/2006 | Nishi | |
| 2006/0103590 A1 | 5/2006 | Divon | |

(56) References Cited

U.S. PATENT DOCUMENTS

| | | |
|---|---|---|
| 2006/0227067 A1 | 10/2006 | Iwasaki |
| 2006/0281061 A1 | 12/2006 | Hightower et al. |
| 2007/0020587 A1 | 1/2007 | Seymore et al. |
| 2007/0097277 A1 | 5/2007 | Hong et al. |
| 2007/0132785 A1 | 6/2007 | Ebersole, Jr. et al. |
| 2007/0177275 A1 | 8/2007 | McGuire, Jr. |
| 2007/0219760 A1 | 9/2007 | Yang |
| 2007/0236800 A1 | 10/2007 | Cakmakci et al. |
| 2007/0242131 A1 | 10/2007 | Sanz-Pastor et al. |
| 2007/0243916 A1 | 10/2007 | Lee |
| 2007/0248283 A1 | 10/2007 | Mack et al. |
| 2007/0273983 A1 | 11/2007 | Hebert |
| 2008/0007181 A1 | 1/2008 | Pickering |
| 2008/0063400 A1 | 3/2008 | Hudson et al. |
| 2008/0071559 A1 | 3/2008 | Arrasvuori |
| 2008/0123049 A1 | 5/2008 | Volk |
| 2008/0130309 A1 | 6/2008 | Condon et al. |
| 2008/0198459 A1 | 8/2008 | Fergason |
| 2008/0204731 A1 | 8/2008 | Williams |
| 2008/0309586 A1 | 12/2008 | Vitale |
| 2009/0002574 A1 | 1/2009 | Sorek et al. |
| 2009/0015735 A1 | 1/2009 | Simmonds |
| 2009/0040308 A1 | 2/2009 | Temovskiy |
| 2009/0112469 A1 | 4/2009 | Lapidot et al. |
| 2009/0122385 A1 | 5/2009 | Hilton |
| 2009/0153437 A1 | 6/2009 | Aharoni |
| 2009/0173788 A1 | 7/2009 | Moraites et al. |
| 2009/0174589 A1 | 7/2009 | Moraites |
| 2009/0190003 A1 | 7/2009 | Park et al. |
| 2009/0228251 A1 | 9/2009 | Cakmakci et al. |
| 2009/0238378 A1 | 9/2009 | Kikinis et al. |
| 2010/0002154 A1 | 1/2010 | Hua |
| 2010/0018285 A1 | 1/2010 | Murphy et al. |
| 2010/0020643 A1 | 1/2010 | Barger et al. |
| 2010/0060551 A1 | 3/2010 | Sugiyama et al. |
| 2010/0103075 A1 | 4/2010 | Kalaboukis et al. |
| 2010/0103196 A1 | 4/2010 | Kumar et al. |
| 2010/0149073 A1 | 6/2010 | Chaum et al. |
| 2010/0165430 A1 | 7/2010 | Buschbeck |
| 2010/0171680 A1 | 7/2010 | Lapidot et al. |
| 2010/0214635 A1 | 8/2010 | Sasaki et al. |
| 2010/0238161 A1 | 9/2010 | Varga et al. |
| 2010/0245387 A1 | 9/2010 | Bachelder et al. |
| 2010/0254001 A1 | 10/2010 | Jang |
| 2010/0277575 A1* | 11/2010 | Ismael ............... G02B 27/2242 348/53 |
| 2010/0279255 A1 | 11/2010 | Williams, II |
| 2010/0321409 A1 | 12/2010 | Komori et al. |
| 2011/0018903 A1 | 1/2011 | Lapstun et al. |
| 2011/0057863 A1 | 3/2011 | Sugihara et al. |
| 2011/0130636 A1 | 6/2011 | Daniel et al. |
| 2011/0202306 A1 | 8/2011 | Eng et al. |
| 2011/0213664 A1 | 9/2011 | Osterhout et al. |
| 2011/0214082 A1 | 9/2011 | Osterhout et al. |
| 2011/0216060 A1 | 9/2011 | Weising et al. |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Dsterhout et al. |
| 2011/0221793 A1 | 9/2011 | King, III et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0228403 A1 | 9/2011 | Masuda et al. |
| 2011/0231757 A1 | 9/2011 | Haddick et al. |
| 2011/0250962 A1 | 10/2011 | Feiner et al. |
| 2011/0283865 A1 | 11/2011 | Collins |
| 2011/0289810 A1 | 12/2011 | D'Souza et al. |
| 2012/0050144 A1 | 3/2012 | Morlock |
| 2012/0068913 A1 | 3/2012 | Bar-Zeev et al. |
| 2012/0120498 A1 | 5/2012 | Harrison et al. |
| 2012/0120499 A1 | 5/2012 | Harrison et al. |
| 2012/0123742 A1 | 5/2012 | Harrison et al. |
| 2012/0154920 A1 | 6/2012 | Harrison et al. |
| 2012/0204307 A1 | 8/2012 | De Mattei et al. |
| 2012/0212400 A1 | 8/2012 | Border et al. |
| 2012/0242695 A1 | 9/2012 | Martin |
| 2012/0274775 A1 | 11/2012 | Reiffel |
| 2012/0326948 A1 | 12/2012 | Crocco et al. |
| 2013/0016123 A1 | 1/2013 | Skarulis |
| 2013/0021224 A1 | 1/2013 | Fujikawa et al. |
| 2013/0163090 A1 | 6/2013 | Yu |
| 2014/0002677 A1 | 1/2014 | Schinker |
| 2014/0104274 A1 | 4/2014 | Hilliges et al. |
| 2014/0152531 A1 | 6/2014 | Murray et al. |
| 2015/0103152 A1* | 4/2015 | Qin ..................... H04N 13/044 348/53 |
| 2015/0177516 A1 | 6/2015 | Blonde et al. |
| 2015/0178992 A1 | 6/2015 | Bhuruth |
| 2015/0260474 A1 | 9/2015 | Rublowsky et al. |
| 2016/0187969 A1 | 6/2016 | Larsen et al. |

FOREIGN PATENT DOCUMENTS

| | | |
|---|---|---|
| DE | 102007009828 A1 | 9/2008 |
| EP | 1418458 A1 | 12/2004 |
| EP | 2624238 A1 | 7/2013 |
| GB | 2461907 A | 1/2010 |
| JP | 55-164801 A | 12/1980 |
| JP | 02-032301 A | 2/1990 |
| JP | 05-303054 A | 11/1993 |
| JP | H07134266 A | 5/1995 |
| JP | H07225790 A | 8/1995 |
| JP | H07244246 A | 9/1995 |
| JP | H08190072 A | 7/1996 |
| JP | 08-278476 A | 10/1996 |
| JP | 10-080575 A | 3/1998 |
| JP | 10-206786 A | 8/1998 |
| JP | 2000047138 A | 2/2000 |
| JP | 2002287077 A | 10/2002 |
| JP | 2006039359 A | 2/2006 |
| JP | 2006091477 A | 4/2006 |
| JP | 2008058461 A | 3/2008 |
| JP | 2008529064 A | 7/2008 |
| JP | 2009069364 A | 4/2009 |
| JP | 2009232133 A | 10/2009 |
| JP | 2010019874 A | 1/2010 |
| JP | 2010020065 A | 1/2010 |
| JP | 2010517090 A | 5/2010 |
| JP | 2011133633 A | 7/2011 |
| TW | I244318 B | 11/2005 |
| WO | 9722964 A1 | 6/1997 |
| WO | 2005017729 A2 | 2/2005 |
| WO | 2008051578 A2 | 5/2008 |
| WO | 2009066408 A1 | 5/2009 |
| WO | 2009094643 A2 | 7/2009 |
| WO | 2010047212 A1 | 4/2010 |
| WO | 2010123934 A1 | 10/2010 |
| WO | 2011114149 A1 | 9/2011 |
| WO | 2012052980 A2 | 4/2012 |
| WO | 2012052981 A2 | 4/2012 |
| WO | 2012083042 A1 | 6/2012 |

OTHER PUBLICATIONS

International Preliminary Report on Patentability for International Patent Application No. PCT/IB2011/055820, dated May 2, 2013, 8 pages.

Examination Report for European Patent Application No. 11806088.8, dated Dec. 7, 2016, 5 pages.

Final Office Action for U.S. Appl. No. 14/884,975, dated Feb. 8, 2017, 36 pages.

International Search Report for International Patent Application No. PCT/US2016/057731, dated Dec. 19, 2016, 12 pages.

(56) References Cited

OTHER PUBLICATIONS

Amery, John G., et al., "Flight Simulation Visual Requirements and a New Display System," Cockpit Displays VI: Displays for Defense Applications, Proceedings of the SPIE, vol. 3690, Aug. 16, 1999, 16 pages.

Author Unknown, "ABI Research Anticipates 'Dramatic Growth' for Augmented Reality via Smartphones," Human-Machine Technology Research Service, ABI Research, Oct. 22, 2009, 1 page.

Author Unknown, "VST-2200FL Flight Simulator," VIRTUAL SimTech, 2013, http://www.virtualsimtech.com/flightsimulators.htm, 2 pages.

Author Unknown, "Head Mounted Displays from INITION," Retrieved from http://www.inition.co.uk/3D-Technologies/productsection/31, Accessed on Dec. 30, 2011, 4 pages.

Author Unknown, "Immersive Displays: Powerwall, CAVE, Headmounted Displays (HMD)," InterSense Applications, Downloaded at http://www.intersense.com/categories/11/, Accessed on Mar. 7, 2011, InterSense Incorporated, 3 pages.

Author Unknown, "Lumus- Consumer Market Products," Retrieved from http://www.lumus-optical.com/index.php?option=com_content&task=view&id=9&1temid=15, Accessed on Dec. 30, 2011, Lumus Ltd., 4 pages.

Author Unknown, "SEOS Ultra Wide Field-of-View Head Mounted Display," SEOS HMD 120140, Product Specifications, Retrieved from http://cgsd.com/SEOSHMD/, Accessed on Oct. 31, 2013, SEOS Displays Ltd., 3 pages.

Author Unknown, "Vuzix High Resolution Video Eyewear: The Future of Big Screen Viewing on the Go!" Vuzix Products, Retrieved from http://www.vuzix.com/consumer, Retrieved Dec. 30, 2011, Vuzix, 2 pages.

Ayras et al., "Near-To-Eye Display Based on Retinal Scanning and a Diffractive Exitpupil Expander," Proceedings of SPIE—The International Society for Optical Engineering, Apr. 12-15, 2010, vol. 7723, No. 77230V, SPIE, 8 pages.

Azuma et al., "Improving Static and Dynamic Registration in an Optical See-through HMD," Computer Graphics: Proceedings of SIGGRAPH 1994, Annual Conference Series, Orlando, Florida, Jul. 24-29, 1994, pp. 197-204.

Bayer et al., "Chapter 3: Introduction to Helmet-Mounted Displays," Excerpt from Helmet-Mounted Displays: Sensation, Perception and Cognition Issues, U.S. Army Medical Department, Medical Research and Material Command, USAARL, 2009, 65 pages.

Billinghurst et al., "Collaboration with Tangible Augmented Reality Interfaces," Proceedings of the Ninth International Conference on Human-Computer Interaction, Aug. 2001, vol. 1, 5 pages.

Cakmakci et al., "Meshfree Approximation Methods for Free-Form Surface Representation in Optical Design With Applications to Head-Worn Displays," Proceedings of the SPIE, Aug. 2008, vol. 7061, SPIE, 15 pages.

Cakmakci et al., "Optical Free-Form Surfaces in Off-Axis Head-Worn Display Design," Mixed and Augmented Reality, 7th IEEE/ACM International Symposium, Mar. 2008, pp. 29-32.

Dejong, C. Dean, "Full-Color, See-Through, Daylight-Readable, Goggle-Mounted Display," Proceedings of SPIE—The International Society for Optical Engineering, Apr. 28, 2011, vol. 8041, SPIE, 13 pages.

Feiner, Steven, et al., "MARS—Mobile Augmented Reality Systems," Columbia University, Computer Graphics and User Interfaces Lab, Downloaded at http://graphics.cs.columbia.edu/projects/mars/, Accessed on Mar. 7, 2011, 4 pages.

Ferscha et al., "Wearable Displays—for Everyone!", Pervasive Computing, Jan.-Mar. 2010, vol. 9, No. 1, Institute of Electrical and Electronics Engineers Inc., pp. 7-10.

Haun, Bzur, "Gartner: Mobility market will reach $1 trillion by 2014," Mobility Management News and Blogs, Visage Mobile, Oct. 21, 2010, 2 pages.

Hastings, A., "Eye Box Performance Parameters for Non Pupil Forming. Head/Helmet Mounted Displays," Tutorial, OPT 521, Dec. 6, 2006, www.optics.arizona.edu/optomech/.../tutorials/HastingsTutorial1.doc, 6 pages.

Henderson, Steve, et al., "Augmented Reality for Maintenance and Repair (ARMAR)," Columbia University, Computer Graphics and User Interfaces Lab, Downloaded at http://graphics.cs.columbia.edu/projects/armar/, Jul. 2007, 4 pages.

Holden, Windsor, "A New Reality for Mobile," Whitepaper, Juniper Research Limited, Feb. 2011, 5 pages.

Hopkins et al., "Simple Thin Lens Optical Systems," US Department of Defense, Military Standardization Handbook: Optical Design, MIL-HDBK-141, Oct. 5, 1962, FSC-6650, Section 7, http://www.optics.arizona.edu/opti510I/references/mil-hdbk-141/ch7_12.pdf, 20 pages.

Jeon et al., "Mosaicing a Wide Geometric Field of View for Effective Interaction in Augmented Reality," Mixed and Augmented Reality, 6th IEEE and ACM International Symposium, Mar. 2007, pp. 265-266.

Kato et al., "Marker Tracking and HMD Calibration for a Video-based Augmented Reality Conferencing System," Proceedings of the 2nd IEEE and ACM International Workshop on Augmented Reality, Oct. 1999, San Francisco, California, 10 pages.

Kato et al., "Virtual Object Manipulation on a Table-Top AR Environment," 2000, 9 pages.

Kiyokawa, Kiyoshi, "A Wide Field-of-View Head Mounted Projective Display Using Hyperbolic Half-Silvered Mirrors," IEEE, Nov. 16, 2007, Cybermedia Center, Osaka University, Osaka, Japan.

Klepper, Sebastian, "Augmented Reality—Display Systems," Technische Universitaet Muenchen, Munich, Germany, Jul. 4, 2007, http://campar.in.tum.de/twiki/pub/Chair/TeachingSs07 ArProseminar/1_Display-Systems_Klepper_Report.pdf.

Kurze et aL, "Smart Glasses: An Open Environment for AR Apps," 2010 9th IEEE International Symposium on Mixed and Augmented Reality (ISMAR), Science & Technology Papers, Oct. 13-16, 2010, Seoul, South Korea, p. 313.

Lingley et al., "A Single-Pixel Wireless Contact Lens Display," J. Micromech. Microeng., 21 (2011) 125014 (8pp); doi:1 0.1 088/0960-1317/21/12/125014; Nov. 22, 2011, Received Jun. 9, 2011, in final form Sep. 19, 2011.

Liu et al., "An Optical See-Through Head Mounted Display with Addressable Focal Planes," IEEE Int'l Symposium on Mixed and Augmented Reality, Sep. 15-18, 2008, Cambridge, UK.

Livingston et al., "An Augmented Reality System for Military Operations in Urban Terrain," Proc of I/ITSEC '02, Orlando, FL, Dec. 2-5, 2002.

McClernon, Chris et al., "PC-Based Desktop Display versus Immersive Head-Mounted Display Flight Simulator Jerformance," Interservice/Industry Training, Simulation, and Education Conference (I/ITSEC), Dec. 2006, http://www.iitsecdocs.com, 7 pages.

Melzer et al., "Guidelines for HMD Design," in Helmet-Mounted Displays: Sensation, Perception and Cognition Issues, C. E. Rash et al., ed., U.S. Army Aeromedical Research Laboratory, Fort Rucker, AL, 2009, Chapter 17, http://www.usaarl.army.mil/publications/hmd_book09/files/Section%2026%20-%20Chapter17 %20Guidelines%20for%20HMD%20design.pdf.

Melzer, James E., "Head-Mounted Displays," The Avionics Handbook, Cary R. Spitzer, ed., CRC Press, Boca Raton Florida, 2001, Chapter 5, http://www.davi.ws/avionics/TheAvionicsHandbook_Cap_5.pdf.

Mori et al., "A Wide-View Parallax-Free Eye-Mark Recorder with a Hyperboloidal Half-Silvered Mirror and Appearance-Based Gaze Estimation," Visualization and Computer Graphics, IEEE Transactions, Aug. 26, 2010, p. 1, vol. PP, No. 99.

Mukawa et al., "A Full Color Eyewear Display Using Holographic Planar Waveguides," IDW'08—Proceedings of the 15th International Display Workshops, Dec. 3-5, 2008, vol. 1, pp. 259-262, Inst. of Image Information and Television Engineers.

Mukawa et al., "A Full-Color Eyewear Display Using Planar Waveguides with Reflection Volume Holograms," Journal of the Society for Information Display, vol. 17, No. 3, pp. 185-193, Mar. 2009, Society for Information Display.

(56) References Cited

OTHER PUBLICATIONS

Nagahara et al., "Super Wide Viewer Using Catadioptric Optics," Proc. ACM Symposium on Virtual Reality Software and Technology (VRST2003), Oct. 2003, pp. 169-175, Osaka, Japan.
Nagahara et al., "Wide Field of View Catadioptrical Head-Mounted Display," Proc. of 2003 IEEE/RSJ, Intl. Conference on Intelligent Robots and Systems, Las Vegas NV, Oct. 2003, pp. 3738-3743.
Nagahara et al., "Wide Field of View Head Mounted Display for Tele-Presence with an Omnidirectional Image Sensor," Computer Vision and Pattern Recognition Workshop, Jun. 16-22, 2003, vol. 7, 6 pages.
Okuma et al., "An Augmented Reality System Using a Real-Time Vision Based Registration," Proceedings of the Fourteenth International Conference on Pattern Recognition, Aug. 16-20, 1998, p. 1226, vol. 2.
Parviz, Babak A., "Augmented Reality in a Contact Lens," IEEE Spectrum, Sep. 2009, http://spectrum.ieee.org/biomedical/bionics/augmented-reality-in-a-contact-lens/0.
Perey, Christine, et al., "Where's the Money? Mobile AR Revenue Streams," Mobile AR Summit Position Paper, Downloaded at http://www.perey.com/MobileARSummit/PEREY-Mobile%20AR-Revenue-Streams.pdf, Feb. 9, 2010, 4 pages.
Pratt, P. D., "Advanced Helmet Sight Reticle Assembly (AHRA)," Jul. 1976, p. 364, Honeywell Inc., Minneapolis Minn. Systems and Research Div.
Rolland et al., "Development of Head-Mounted Projection Displays for Distributed, Collaborative, Augmented Reality Applications," Oct. 2005, Presence, vol. 14, No. 5, pp. 528-549.
Rolland et al., "Invited Paper: Head-Worn Displays—Lens Design," 48th Annual SID Symposium, Seminar, and Exhibition 2010, Display Week 2010, May 23-28, 2010, vol. 2, pp. 855-858, Society for Information Display.
Rose, Melinda, "Microdisplays: Coming Soon to an Eye Near You?", Photonics Spectra, Sep. 2008, vol. 42, No. 9, pp. 68-69, Laurin Publishing Co. Inc.
Schonlau et al., "Personal Viewer: A Wide-Field Low-Profile See-Through Eyewear Display," Proceedings of the SPIE—The International Society for Optical Engineering, Apr. 14-16, 2004, vol. 5443, No. 1, pp. 277-287, Orlando, FL, SPIE—Int. Soc. Opt. Eng.
Schwald et al., "An Augmented Reality System for Training and Assistance to Maintenance in the Industrial Context," Journal of WSCG, Feb. 3-7, 2003, vol. 11, No. 1, Plzen, Czech Republic.
Spitzer et al., "Video I/0 Interface for Wearable Computers," Proceedings of the SPIE—The International Society for Optical Engineering, vol. 3689, pp. 278-283, 1999, Conference: Helmet- and Head-Mounted Displays IV, Apr. 5-6, 1999, Orlando, FL, SPIE—Int. Soc. Opt. Eng, USA.
Takeda et al., "Design and Implementation of a Wide Field-of-View Head Mounted Projective Display," Journal of the Institute of Image Information and Television Engineers, Jun. 2009, pp. 794-800, vol. 63, No. 6, Institute of Image Information and Television Engineers, Osaka, Japan.
Takeda et al., "Poster: A Virtual Walkthrough System with a Wide Field-of-View Stereo Head Mounted Projective Display," 3D User Interfaces, IEEE Symposium, Mar. 14-15, 2009, p. 149, Lafayette, LA.
Upton et al., "Eyeglass Head-Up Display [Vibrating Fiber Optic Assembly," 1981 SID International Symposium, Digest of Papers, Apr. 28-30, 1981, vol. XII, pp. 48-49, New York, NY, SID, Los Angeles, CA.
Vanden Brook, T., "Device Helps Pinpoint Snipers: Technology is Critical for U.S. Combat Troops," USA Today, Wednesday, Mar. 2, 2011.
Von Waldkirch et al., "Spectacle-Based Design of Wearable See-Through Display for Accommodation-Free Viewing," Proceedings of the Second International Conference on Pervasive Computing, (Lecture Notes in Comput. Sci. vol. 3001 ), Apr. 18-23, 2004, pp. 106-123, Springer-Verlag, Berlin, Germany.
Wang, Robert Y. et al., "Real-time hand-tracking with a color glove," retrieved Dec. 16, 2014 from http://people.csail.mit.edu/rywang/hand/, 3 pages.
Yang et al., "Hybrid Diffractive-Refractive 67 degree-Diagonal Field of View Optical See-Through Head-Mounted Display," Institute of Modern Optics, Aug. 17, 2005, pp. 351-355, vol. 116, No. 7, Optik—Internat, Nankai University, Tianjin, China.
Yavrucuk, I. et al., "A Low Cost Flight Simulator Using Virtual Reality Tools," IEEE Aerospace and Electronics Systems Magazine, vol. 26, Issue 4, Apr. 2011, IEEE, pp. 10-14.
International Search Report for PCT/IB2011/055824 dated May 16, 2012, 4 pages.
Written Opinion of the International Searching Authority for PCT/IB2011/055824 dated May 2, 2013, 5 pages.
International Preliminary Report on Patentability for PCT/IB2011/055824 dated May 2, 2013, 7 pages.
Examination Report for Australian Patent Application No. 2011319480 dated Oct. 27, 2014, 3 pages.
Examination Report for Australian Patent Application No. 2011319481 dated Oct. 23, 2014, 3 pages.
Examination Report for Australian Patent Application No. 2011343660 dated Oct. 31, 2014, 3 pages.
International Search Report for PCT/IB2011/055820 dated May 21, 2012, 4 pages.
International Search Report and Written Opinion for PCT/US2011/065201 dated Mar. 7, 2012, 14 pages.
International Preliminary Report on Patentability for PCT/US2011/065201 dated Jun. 27, 2013, 11 pages.
International Search Report for PCT/IB2011/055826 dated Sep. 14, 2012, 4 pages.
International Preliminary Report on Patentability for PCT/IB2011/055826 dated May 2, 2013, 11 pages.
First Office Action for Chinese Patent Application No. 201180060659.0, dated Nov. 3, 2014, 10 pages.
First Office Action for Chinese Patent Application No. 201180060662.2, dated Nov. 2, 2014, 13 pages.
Non-final Office Action for U.S. Appl. No. 13/211,365 dated Oct. 24, 2012, 12 pages.
Final Office Action for U.S. Appl. No. 13/211,365 dated Feb. 22, 2013, 15 pages.
Non-final Office Action and Examiner-Initiated Interview Summary for U.S. Appl. No. 13/211,365 dated Jun. 14, 2013, 18 pages.
Final Office Action for U.S. Appl. No. 13/211,365 dated Oct. 18, 2013, 22 pages.
Non-final Office Action for U.S. Appl. No. 13/211,365 dated Apr. 22, 2014, 9 pages.
Notice of Allowance for U.S. Appl. No. 13/211,365, dated Aug. 8, 2014, 7 pages.
Non-Final Office Action for U.S. Appl. No. 13/211,365, dated Jan. 12, 2015, 20 pages.
Non-final Office Action for U.S. Appl. No. 13/211,372 dated Nov. 21, 2012, 9 pages.
Non-final Office Action for U.S. Appl. No. 13/211,372 dated Mar. 7, 2013, 12 pages.
Final Office Action for U.S. Appl. No. 13/211,372 dated Aug. 1, 2013, 7 pages.
Notice of Allowance for U.S. Appl. No. 13/211,372 dated Sep. 6, 2013, 8 pages.
Non-final Office Action for U.S. Appl. No. 13/211,389 dated Feb. 26, 2013, 21 pages.
Final Office Action for U.S. Appl. No. 13/211,389 dated Jul. 12, 2013, 25 pages.
Notice of Allowance and Applicant-Initiated Interview Summary for U.S. Appl. No. 13/211,389 dated Sep. 19, 2013, 10 pages.
Notice of Allowance for U.S. Appl. No. 13/211,389 dated Jan. 6, 2014, 8 pages.
Non-final Office Action for U.S. Appl. No. 13/327,217 dated Jan. 17, 2014, 14 pages.
Final Office Action for U.S. Appl. No. 13/327,217 dated Jul. 31, 2014, 13 pages.
Advisory Action for U.S. Appl. No. 13/327,217 dated Nov. 5, 2014, 3 pages.

(56) References Cited

OTHER PUBLICATIONS

Office Action for Mexican Patent Application No. MX/a/2013/006722, dated Dec. 8, 2014, 7 pages.
Examination Report for European Patent Application No. 11815630.6, dated Nov. 20, 2015, 4 pages.
Notification of Reason(s) for Rejection for Japanese Patent Application No. 2013-534453, dated Dec. 22, 2015, 9 pages.
Patent Examination Report No. 2 for Australian Patent Application No. 2011343660, dated Oct. 22, 2015, 3 pages.
Notice of Acceptance for Australian Patent Application No. 2011319481, dated Oct. 12, 2015, 3 pages.
Second Office Action for Chinese Patent Application No. 201180060659.0, dated Jun. 30, 2015, 6 pages.
Third Office Action for Chinese Patent Application No. 201180060659.0, dated Dec. 15, 2015, 6 pages.
Notification of Reason(s) for Rejection for Japanese Patent Application No. JP 2013-534454, dated Sep. 17, 2015, 7 pages.
Office Action and Search Report for Taiwanese Patent Application No. 100148694, dated Dec. 1, 2015, 18 pages.
Second Office Action for Chinese Patent Application No. 201180060662.2, dated Jun. 10, 2015, 7 pages.
Office Action and Search Report for Taiwanese Patent Application No. 100148681, dated Oct. 5, 2015, 15 pages.
First Office Action for Chinese Patent Application No. 201180067287.4, dated Feb. 4, 2015, 11 pages.
Second Office Action for Chinese Patent Application No. 201180067287.4, dated Oct. 10, 2015, 9 pages.
Examination Report for European Patent Application No. 11806088.8, dated Oct. 27, 2015, 3 pages.
Notification of Reason(s) for Rejection for Japanese Patent Application No. JP 2013-544784, dated Aug. 17, 2015, 9 pages.
Final Office Action for U.S. Appl. No. 13/211,365, dated Jun. 15, 2015, 23 pages.
Notice of Allowance for U.S. Appl. No. 13/211,365, dated Sep. 21, 2015, 7 pages.
Non-Final Office Action for U.S. Appl. No. 13/327,217, dated May 21, 2015, 12 pages.
Final Office Action for U.S. Appl. No. 13/327,217, dated Oct. 8, 2015, 15 pages.
Advisory Action for U.S. Appl. No. 13/327,217, dated Jan. 4, 2016, 3 pages.
Non-final Office Action for U.S. Appl. No. 13/211,365, dated Feb. 2, 2016, 15 pages.
Unknown, "Optical head-mounted display," Wikipedia, last modified Feb. 25, 2016, en.wikipedia.org/wiki/Optical_head-mounted_display, 18 pages.
Hua, Hong, "Past and future of wearable augmented reality displays and their applications," SPIE Proceedings, vol. 9186, Oct. 20, 2014, SPIE, pp. 91860O-1 to 91860O-12.
Olwal, Alex, et al., "ASTPR: An Autostereoscopic Optical See-through Augmented Reality System," Proceedings of the Fourth IEEE and ACM International Symposium on Mixed and Augmented Reality, Oct. 5-8, 2005, Vienna, Austria, IEEE, pp. 24-27.
Rolland, Jannick, P., "Wide-angle, off-axis, see-through head-mounted display," Optical Engineering, vol. 39, Issue 7, Jul. 1, 2000, Society of Photo-Optical Instrumentation Engineers, pp. 1760-1767.
Examination Report for European Patent Application No. 11815631.4, dated Apr. 13, 2016, 11 pages.
Notice of Allowance and Search Report for Taiwanese Patent Application No. 100148681, dated Mar. 14, 2016, 12 pages.
Third Office Action for Chinese Patent Application No. 201180067287.4, dated Apr. 12, 2016, 10 pages.
Final Office Action for U.S. Appl. No. 13/211,365, dated Jul. 11, 2016, 13 pages.
International Search Report and Written Opinion for PCT/US2015/055918, dated Jan. 27, 2016, 9 pages.
Non-Final Office Action for U.S. Appl. No. 13/327,217, dated Jun. 2, 2016, 18 pages.

Debevec, Paul, et al., "A Lighting Reproduction Approach to Live-Action Compositing," Proceedings of the 29th annual conference on Computer graphics and interactive techniques (SIGGRAPH), Jul. 21-26, 2002, San Antonio, Texas, ACM, pp. 1-10.
Waese, Jamie, "SIGGRAPH paper: Infrared Chroma Key," waese.com/infrared-chroma-key/, 2015, Jamie Waese, pp. 1-3.
Decision of Final Rejection for Japanese Patent Application No. 2013-534453, dated Jul. 26, 2016, 5 pages.
Patent Examination Report No. 1 for Australian Patent Application No. 2015249168, dated Jun. 27, 2016, 3 pages.
Notification of Reasons for Rejection for Japanese Patent Application No. 2013-534454, dated Jun. 1, 2016, 13 pages.
Notification of Reasons for Rejection for Japanese Patent Application No. 2013-544784, dated May 31, 2016, 11 pages.
Non-Final Office Action for U.S. Appl. No. 14/884,975, dated Sep. 9, 2016, 30 pages.
Non-Final Office Action for U.S. Appl. No. 14/501,509, dated Jul. 15, 2016, 7 pages.
International Search Report and Written Opinion for International Patent Application No. PCT/US2016/020444, dated Jun. 14, 2016, 11 pages.
Non-Final Office Action for U.S. Appl. No. 13/303,607, dated Mar. 20, 2014, 23 pages.
Final Office Action for U.S. Appl. No. 13/303,607, dated Oct. 9, 2014, 27 pages.
Non-Final Office Action for U.S. Appl. No. 13/304,780 dated Jan. 30, 2013, 13 pages.
Final Office Action for U.S. Appl. No. 13/304,780, dated Aug. 15, 2013, 16 pages.
Notice of Allowance and Applicant-Initiated Interview Summary for U.S. Appl. No. 13/304,780, dated Nov. 8, 2013, 15 pages.
Office Action for Mexican Patent Application No. MX/a/2013/004453, dated Oct. 12, 2016, 3 pages.
Notice of Acceptance for Australian Patent Application No. 2015249168, dated Nov. 4, 2016, 2 pages.
Office Action for Mexican Patent Application No. MX/a/2013/004454, dated Oct. 12, 2016, 3 pages.
Decision of Rejection for Chinese Patent Application No. 201180067287.4, dated Oct. 17, 2016, 14 pages.
Advisory Action for U.S. Appl. No. 13/211,365, dated Nov. 7, 2016, 3 pages.
Applicant-Initiated Interview Summary for U.S. Appl. No. 13/211,365, dated Nov. 17, 2016, 4 pages.
Notice of Allowance and Applicant-Initiated Interview Summary for U.S. Appl. No. 13/211,365, dated Nov. 23, 2016, 9 pages.
Final Office Action for U.S. Appl. No. 13/327,217, dated Nov. 30, 2016, 24 pages.
Notice of Allowance for U.S. Appl. No. 13/211,365, dated Mar. 28, 2017, 4 pages.
Advisory Action for U.S. Appl. No. 14/884,975, dated Apr. 21, 2017, 3 pages.
Notice of Allowance and Examiner-Initiated Interview Summary for U.S. Appl. No. 13/327,217, dated Mar. 24, 2017, 12 pages.
Non-Final Office Action for U.S. Appl. No. 14/959,444, dated Jul. 3, 2017, 9 pages.
Non-Final Office Action for U.S. Appl. No. 14/884,975, dated Jul. 12, 2017, 45 pages.
Non-Final Office Action for U.S. Appl. No. 14/858,733, dated Jun. 26, 2017, 11 pages.
Non-Final Office Action for U.S. Appl. No. 15/142,380, dated Jun. 27, 2017, 19 pages.
Decision of Final Rejection for Japanese Patent Application No. 2013-534454, dated Mar. 31, 2017, 11 pages.
Decision of Final Rejection for Japanese Patent Application No. 2013-544784, dated Mar. 31, 2017, 9 pages.
International Preliminary Report on Patentability for International Patent Application No. PCT/US2015/055918, dated Apr. 27, 2017, 6 pages.
Decision to Grant a Patent for Japanese Patent Application No. 2013-534454, dated Oct. 18, 2017, 6 pages.
Notification of Reexamination for Chinese Patent Application No. 201180067287.4, dated Sep. 5, 2017, 10 pages.

(56) References Cited

OTHER PUBLICATIONS

Decision to Grant a Patent for Japanese Patent Application No. 2013-544784, dated Oct. 18, 2017, 6 pages.
International Preliminary Report on Patentability for International Patent Application No. PCT/US2016/020444, dated Sep. 14, 2017, 8 pages.
Final Office Action for U.S. Appl. No. 14/884,975, dated Dec. 11, 2017, 45 pages.
Final Office Action for U.S. Appl. No. 15/142,380, dated Nov. 3, 2017, 27 pages.
Final Office Action for U.S. Appl. No. 14/858,733, dated Dec. 22, 2017, 17 pages.
Notification of Reason for Rejection for Japanese Patent Application No. 2016-229136, dated Oct. 30, 2017, 5 pages.
Office Action for Canadian Patent Application No. 2,815,461, dated Oct. 26, 2017, 4 pages.
Office Action for Canadian Patent Application No. 2,821,401, dated Oct. 17, 2017, 4 pages.
Office Action for Korean Patent Application No. 10-2013-701735, dated Oct. 30, 2017, 10 pages.
Office Action for Canadian Patent Application No. 2,815,452, dated Oct. 31, 2017, 4 pages.
Office Action for Korean Patent Application No. 10-2013-7013039, dated Dec. 18, 2017, 9 pages.
Examination Report for European Patent Application No. 11815630.6, dated Dec. 13, 2017, 6 pages.
Final Office Action for U.S. Appl. No. 14/959,444, dated Jan. 16, 2018, 11 pages.
Notice of Allowance for U.S. Appl. No. 15/142,380, dated Feb. 7, 2018, 5 pages.
Decision of Reexamination for Chinese Patent Application No. 201180067287.4, dated Feb. 11, 2018, 23 pages.

* cited by examiner

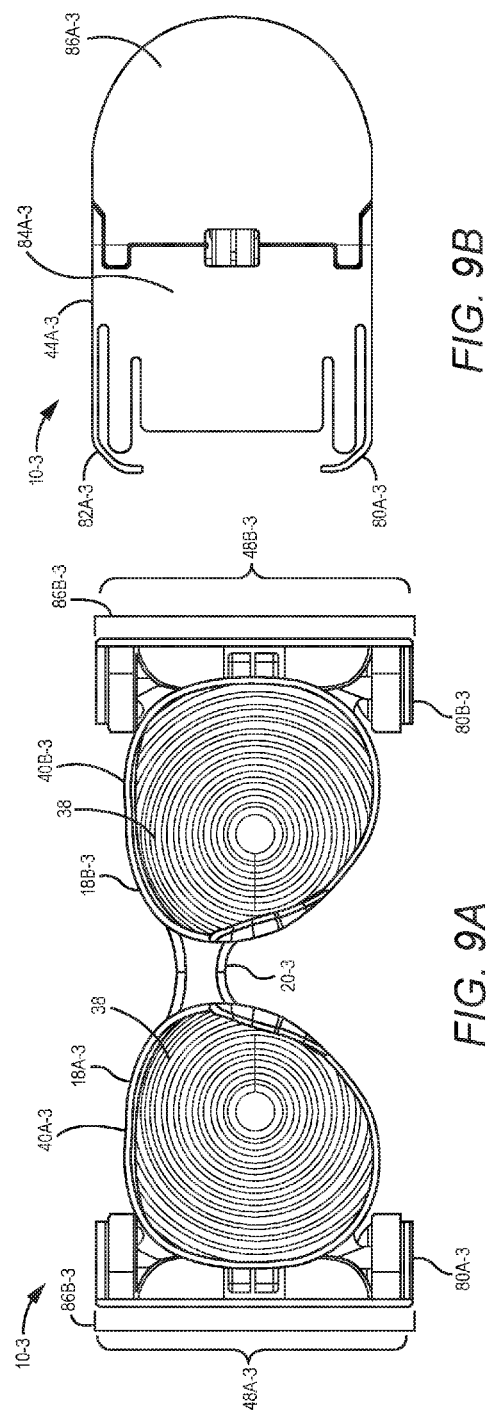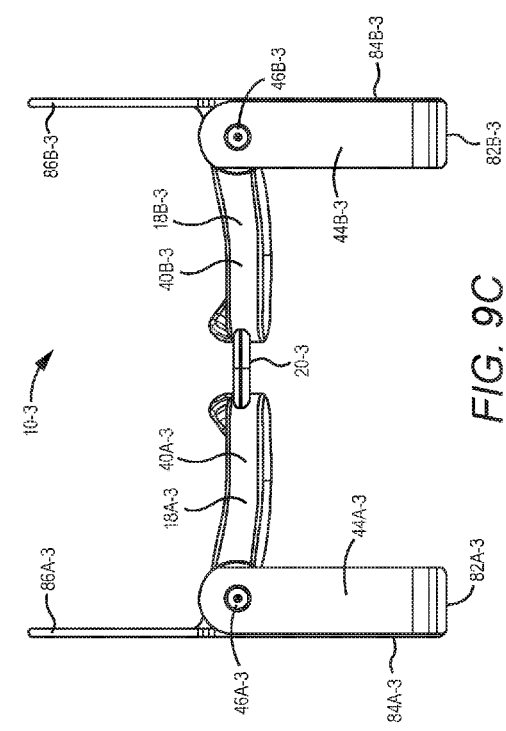
FIG. 9A
FIG. 9B
FIG. 9C

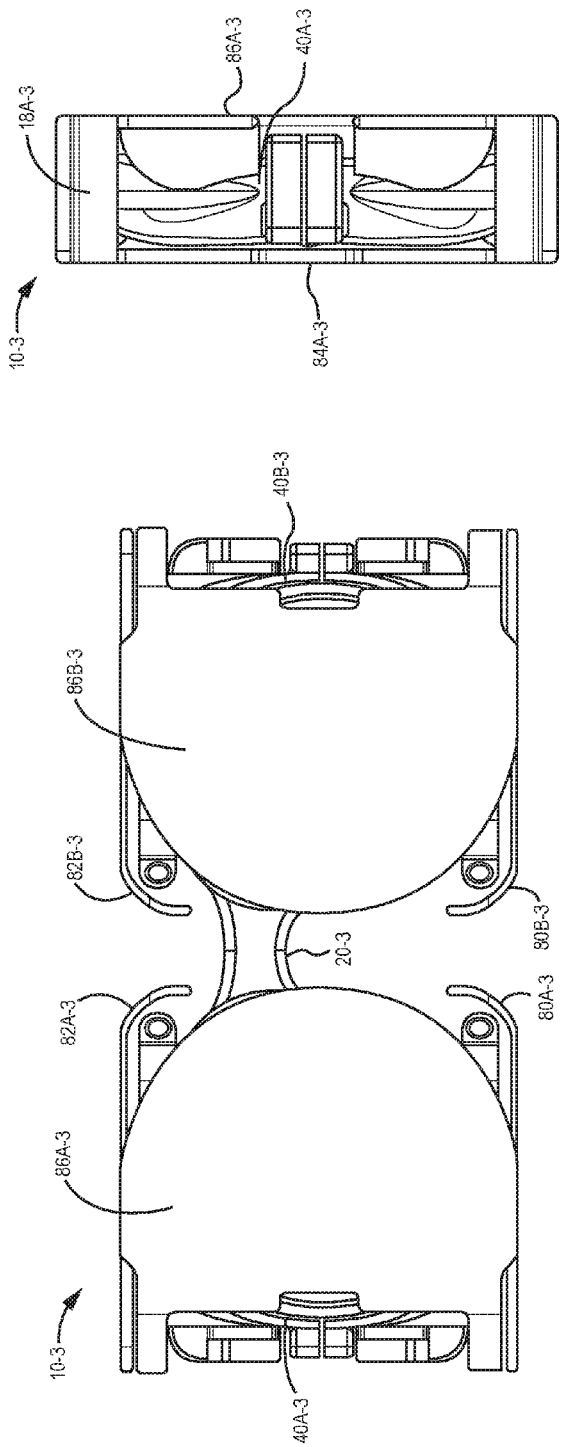
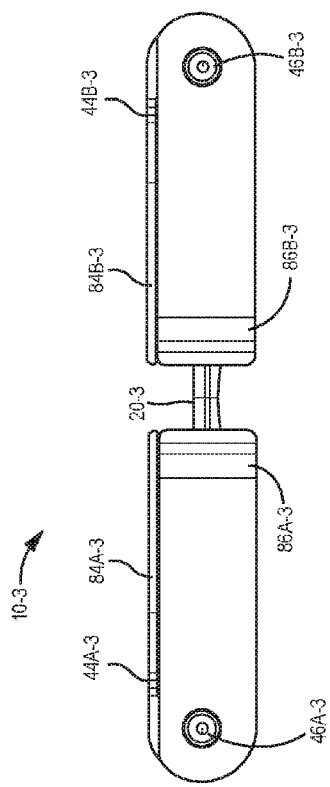
FIG. 10A
FIG. 10B
FIG. 10C

WEARABLE DISPLAY SYSTEM

PRIORITY APPLICATIONS

This application claims the benefit of provisional patent application Ser. No. 62/126,929, filed on Mar. 2, 2015, entitled "WEARABLE VIRTUAL REALITY SYSTEM," the disclosure of which is hereby incorporated herein by reference in its entirety.

TECHNICAL FIELD

The embodiments relate to display systems and in particular to wearable display systems.

BACKGROUND

Virtual reality (VR) allows a user to be immersed in an environment that is different from a real-world environment currently experienced by the user. For example, a user may perceive a VR image as a three-dimensional (3D) image, thereby providing an illusion of depth and distance to the VR environment. The VR environment may also fill a user's entire field of view (FOV), which may help to make the VR environment more immersive to the user. VR has a wide range of applications, including entertainment, training, and education.

VR often requires a relatively large and costly image-generation system and associated equipment. There is increasing interest in VR headgear to facilitate mobile VR experiences, but typical VR headgear is bulky and expensive.

SUMMARY

According to one embodiment, a wearable display system is disclosed. The system comprises a first lens sub-assembly defining a first optical path and a second lens sub-assembly defining a second optical path. The first and second lens sub-assemblies are disposed in a frame in respective first and second lens-holding sub-assemblies, with a bridge coupled therebetween. The frame also has a device holder configured to maintain a display of a device in the first and second optical paths. In one embodiment, the display is maintained within a predetermined range of distances and angles with respect to the first and second lens sub-assemblies. This arrangement permits the display, such as, for example, a smartphone display, to provide a specific image to each eye of a user. In some embodiments, different images can be provided to each eye independently from different portions of a common display, thereby enabling the user to perceive a three-dimensional image.

According to one embodiment, a wearable display system is disclosed. The system comprises a first lens sub-assembly defining a first optical path. The system further comprises a second lens sub-assembly defining a second optical path. The system further comprises a frame. The frame comprises a lens-holding sub-assembly. The lens-holding sub-assembly comprises a first lens holder configured to hold the first lens sub-assembly. The lens-holding sub-assembly further comprises a second lens holder configured to hold the second lens sub-assembly. The frame further comprises a bridge coupled between the first lens holder and the second lens holder. The system further comprises a device holder. The device holder is configured to maintain a display of a device in the first optical path and in the second optical path. The device holder is further configured to maintain the display within a predetermined range of distances with respect to the first lens sub-assembly and the second lens sub-assembly. The device holder is further configured to maintain the display within a predetermined range of angles with respect to the first lens sub-assembly and the second lens sub-assembly.

According to another embodiment, a method of using a wearable display system is disclosed. The method comprises positioning a frame of the wearable display system in a field of view of a user. The frame comprises a lens-holding sub-assembly. The lens-holding sub-assembly comprises a first lens holder holding a first lens sub-assembly. The lens-holding sub-assembly further comprises a second lens holder holding a second lens sub-assembly. The frame further comprises a bridge coupled between the first lens holder and the second lens holder. The method further comprises disposing a display of a device in a device holder of the wearable display system. The display is maintained within a predetermined range of distances with respect to the first lens sub-assembly and the second lens sub-assembly. The display is maintained within a predetermined range of angles with respect to the first lens sub-assembly and the second lens sub-assembly. The first lens sub-assembly defines a first optical path between a first eye of the user and the display. The second lens sub-assembly defines a second optical path between a second eye of the user and the display.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 9A-9C are diagrams illustrating respective rear, side, and top views of a wearable display system having additional features for retaining a display, according to an alternative embodiment;

FIGS. 10A-10C are diagrams illustrating respective rear, side, and top views of the wearable display system of FIGS. 9A-9C in a folded configuration;

DETAILED DESCRIPTION

The embodiments set forth subsequently represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

According to one embodiment, a wearable display system is disclosed. The system comprises a first lens sub-assembly defining a first optical path and a second lens sub-assembly defining a second optical path. The first and second lens sub-assemblies are disposed in a frame in respective first and second lens-holding sub-assemblies, with a bridge coupled therebetween. The frame also has a device holder configured to maintain a display of a device in the first and second optical paths. In one embodiment, the display is maintained within a predetermined range of distances and angles with respect to the first and second lens sub-assemblies. This arrangement permits the display, such as, for example, a smartphone display, to provide a specific image to each eye of a user. In some embodiments, different images can be provided to each eye independently from different portions of a common display, thereby enabling the user to perceive a three-dimensional (3D) image.

Figure 1:
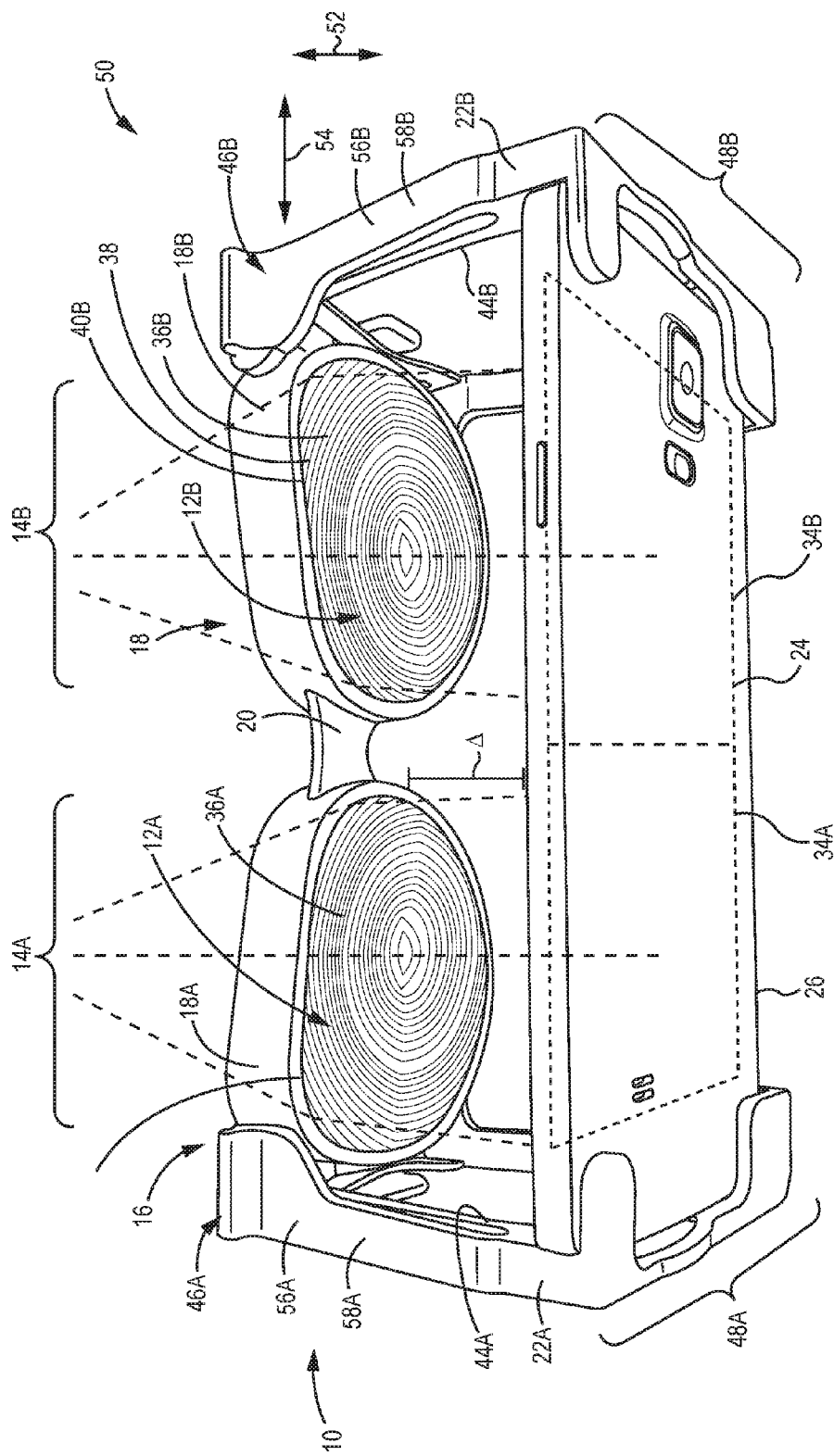
FIG. 1 is a diagram illustrating a wearable display system suitable for providing a virtual-reality (VR) image to a user, in an unfolded configuration, according to one embodiment.

In this regard, FIG. 1 is a diagram illustrating a wearable display system 10 in an unfolded configuration, according to one embodiment. The system 10 comprises a first lens sub-assembly 12A defining a first optical path 14A and a second lens sub-assembly 12B defining a second optical path 14B. The first lens sub-assembly 12A is disposed in a frame 16 in a first lens-holding sub-assembly 18A, and the second lens sub-assembly 12B is disposed in the frame 16 in a second lens-holding sub-assembly 18B. The first and second lens-holding sub-assemblies 18A, 18B (generally, lens-holding sub-assemblies 18) are coupled to each other via a bridge 20. The frame 16 also has a first device holder 22A and a second device holder 22B (generally, device holders 22) configured to maintain a display 24 of a display device 26 in the first and second optical paths 14A, 14B (generally, optical paths 14). In one embodiment, the display 24 is maintained within a predetermined range of distances Δ and angles θ with respect to the first and second lens sub-assemblies 12A and 12B (generally, lens sub-assemblies 12). In this embodiment, the display 24 has two distinct, non-overlapping portions 34A, 34B (generally, portions 34), each corresponding to the lens sub-assemblies 12. This arrangement permits the display 24 independently to provide a specific image to eyes 30A, 30B (generally, eyes 30) of a user 32 (shown in FIG. 2), such as, for example, a 3D and/or virtual-reality (VR) image.

Each of the lens sub-assemblies 12 comprises a respective Fresnel lens system 36A, 36B (generally, Fresnel lens systems 36), each having at least one Fresnel lens 38. In one embodiment, each Fresnel lens system 36 comprises two stacked Fresnel lenses 38 in a stacked relationship, such that each lens sub-assembly 12 refracts light twice. Using multiple, stacked Fresnel lenses may be selected based on, for example, the desired focal characteristics of the respective Fresnel lens system 36 and on dimensional and other design constraints. An example of a suitable Fresnel lens system 36 is described in U.S. patent application Ser. No. 14/858,733 ("FRESNEL LENS WITH REDUCED DRAFT FACET VISIBILITY"), filed Sep. 18, 2015, which is incorporated by reference in its entirety herein for this purpose.

The system 10 includes the frame 16 that includes the lens-holding sub-assemblies 18. The lens-holding sub-assemblies 18 include the bridge 20 and a pair of lens holders 40A, 40B (generally, pair of lens holders 40) coupled to either side of the bridge 20. The pair of lens holders 40 is configured to hold the lens sub-assemblies 12.

The frame 16 includes the device holders 22 that are configured to hold the display device 26 and maintain the display device 26 within the predetermined range of distances Δ, such as a distance 28, and within the predetermined range of angles with respect to the Fresnel lens systems 36. The display device 26 may comprise any suitable computing device, such as, by way of non-limiting example, a smartphone or a computing tablet.

In one embodiment, the device holder 22 comprises a pair of support members 44A, 44B (generally, support members 44). The support members 44 are hingedly coupled to the lens-holding sub-assemblies 18 via respective hinges 46A, 46B. Each support member 44 comprises two display device grip members 48A, 48B. In some embodiments, the system 10 has a folded configuration and an unfolded configuration 50. In the unfolded configuration 50, each support member 44 extends in a plane 52 that is substantially perpendicular to a plane 54 of the lens-holding sub-assemblies 18.

In one embodiment, each support member 44 may be biased toward the folded configuration. This biasing has two advantages. First, the risk of the system 10 unfolding during storage and/or transit, such as in a backpack or carrying case, is reduced. Second, the biasing causes the display device grip members 48A, 48B to exert opposing forces on the display device 26 when the display device 26 is disposed in the system 10, thereby more securely gripping and holding the display device 26 in place within the system 10 during use. The biasing may be accomplished by one or more torsional springs (not shown) or other biasing components.

In one embodiment, peak attachment members 56A, 56B (generally, peak attachment members 56) are configured to be coupled to a peak of a hat. In one embodiment, the peak attachment members 56 comprise a pair of arms 58A, 58B that are coupled to the device holder 22. In one embodiment, the peak attachment members 56 are configured, when coupled to a peak of a hat, to maintain the lens-holding sub-assemblies 18 within a predetermined range of distances Δ from the eyes 30 of the user 32.

Figure 2:
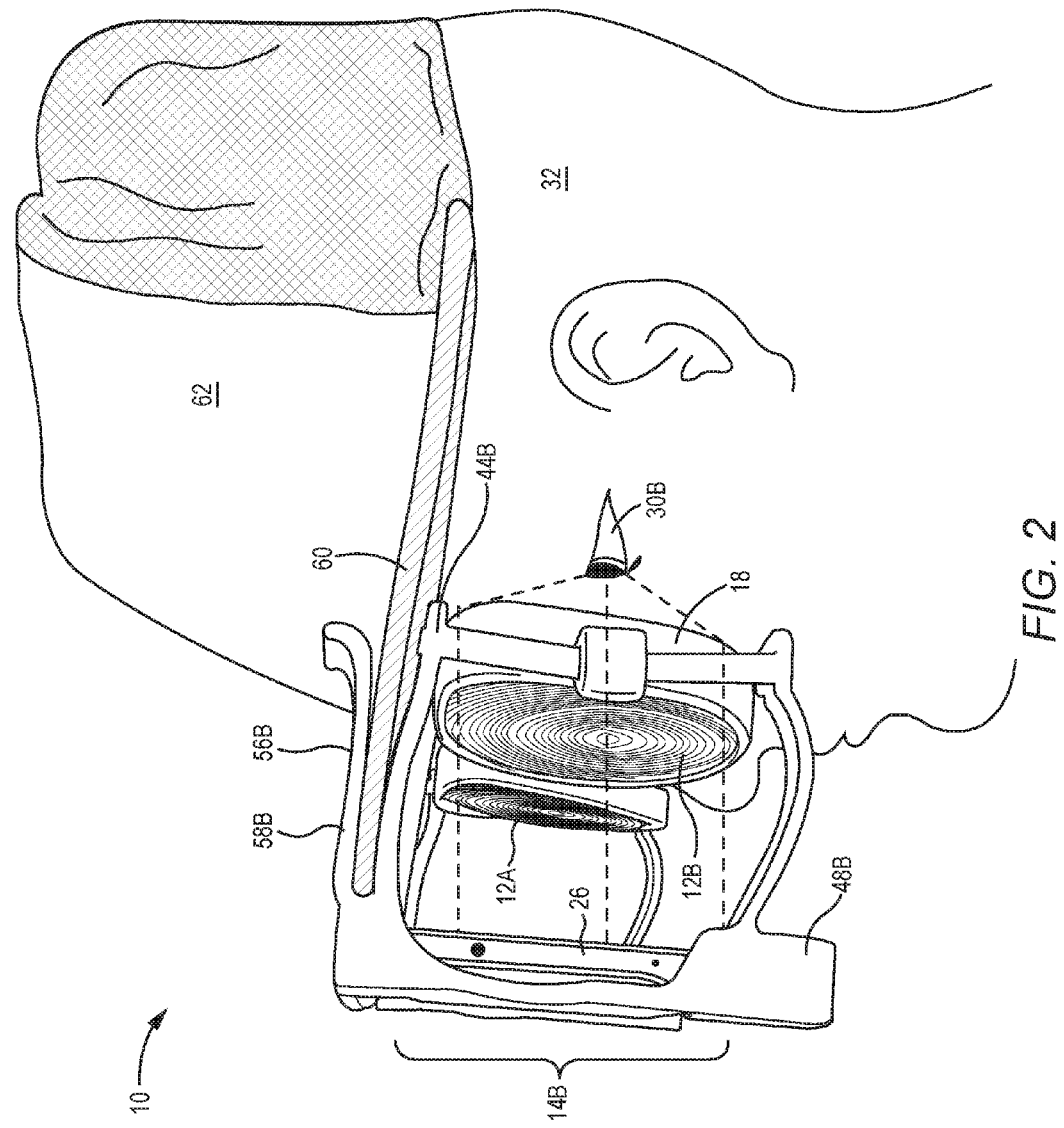
FIG. 2 is a diagram of the wearable display system illustrated in FIG. 1 shown in the unfolded configuration and coupled to a peak of a baseball cap, according to one embodiment.

In this regard, FIG. 2 is a diagram of the system 10 shown in the unfolded configuration 50 coupled to a peak 60 of a baseball cap 62 being worn by a user 32, thereby positioning the system 10 in front of the eyes 30 of the user 32 and in the field of view of the user 32. In this view, it can also be seen that different portions 34A, 34B of the display 24 may be positioned in front of each eye 30A, 30B. As will be described in greater detail with respect to FIG. 6, in some embodiments, different portions 34 of the display 24 are disposed in the separate optical paths 14, thereby enabling the user 32 to perceive the different portions 34 of the display 24 through the Fresnel lens systems 36 as a single, 3D VR image.

The peak attachment members 56, in this example embodied as the pair of arms 58A, 58B, are configured to maintain the lens-holding sub-assemblies 18 within the predetermined range of distances Δ from the eyes 30 of the user 32 (not illustrated) when coupled to the peak 60. In some embodiments, the system 10 includes a shield, shroud, or sock, that blocks external light that may otherwise reflect inside of the Fresnel lens systems 36. The shield (not shown) can also operate as a carrying case when not in operation.

Figure 3:
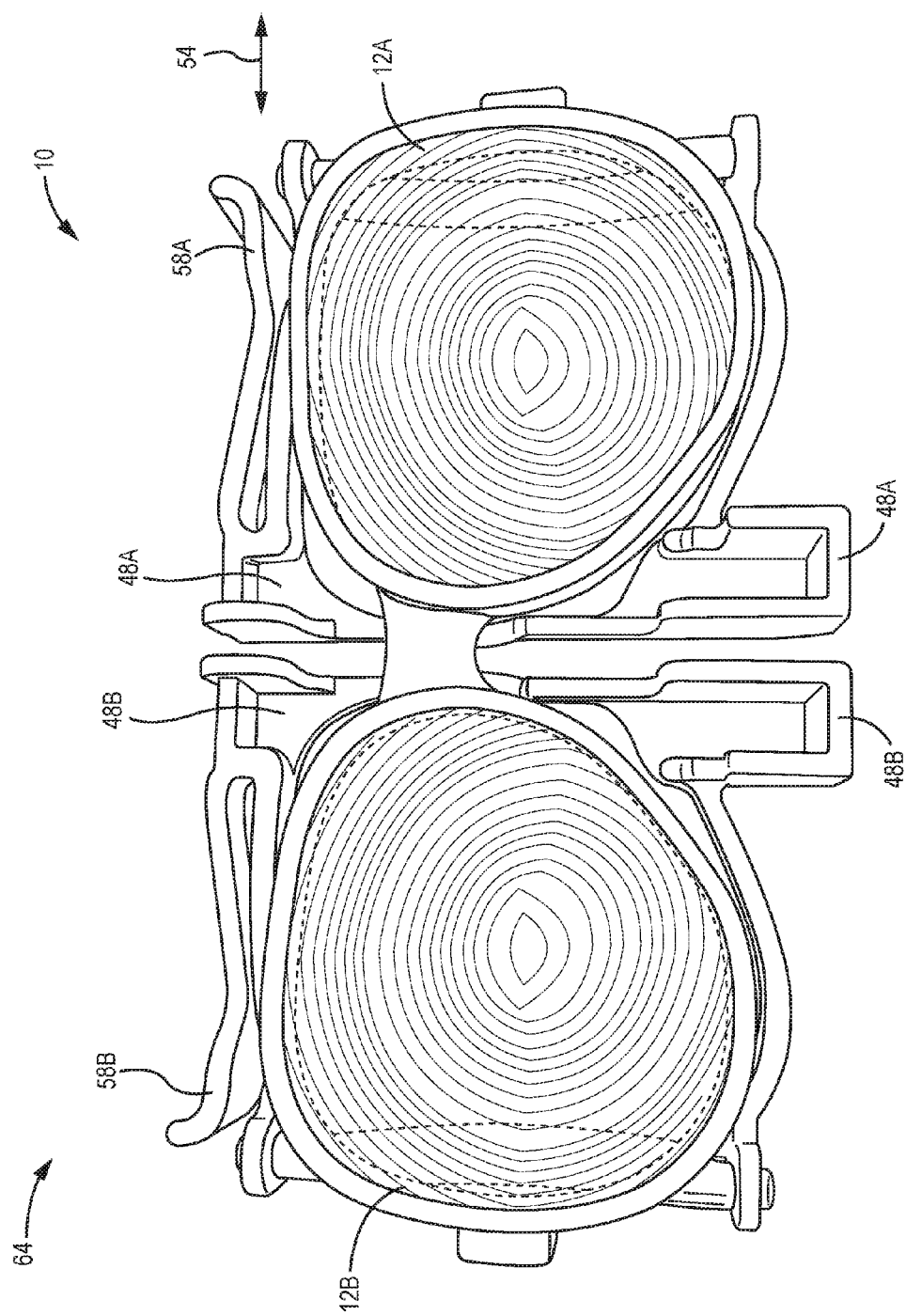
FIG. 3 is a diagram illustrating a front view of the wearable display system in a folded configuration, according to one embodiment.

FIG. 3 is a diagram illustrating a front view of the system 10 in a folded configuration 64. In the folded configuration 64, the support members 44 extend in the plane 52 that is substantially parallel to the plane 54 of the lens-holding sub-assemblies 18. In the folded configuration 64, the system 10 has a relatively flat form factor and can be easily and inconspicuously transported in the pocket of a jacket or shirt or in a purse.

Figure 4:
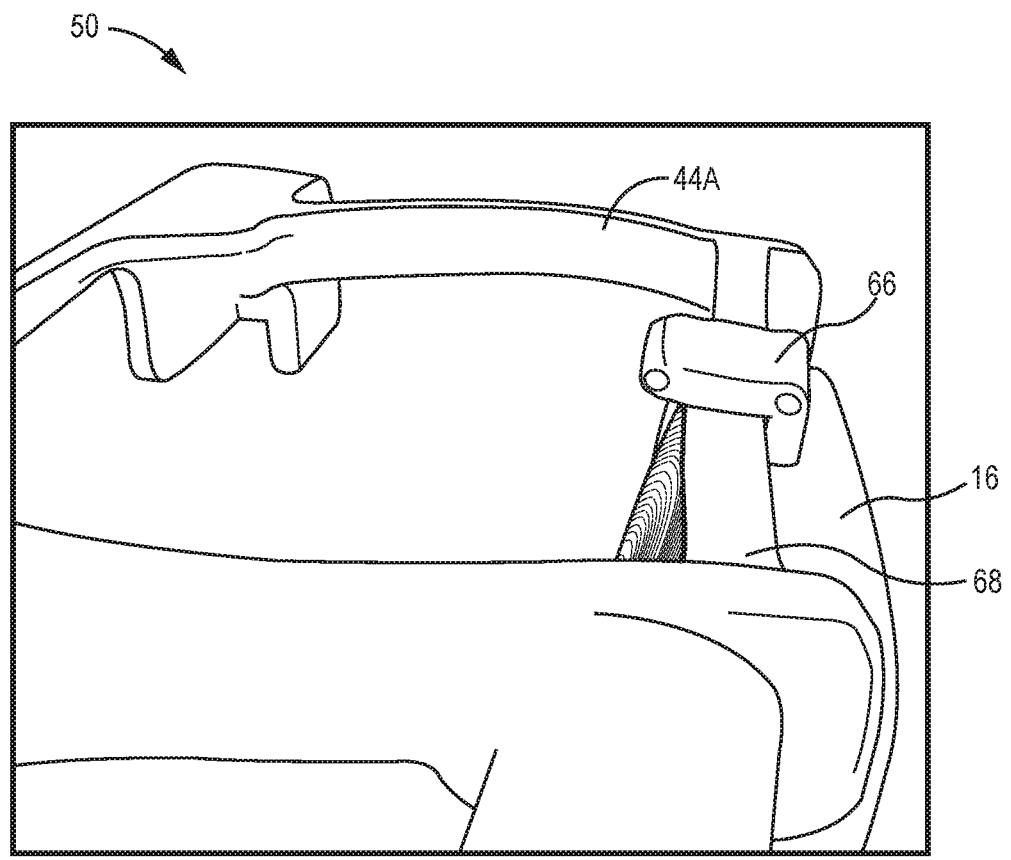
FIG. 4 is a diagram illustrating a locking mechanism of the wearable VR system wherein hinged support members of the wearable display system are locked when in the unfolded configuration.

FIG. 4 is a diagram illustrating a locking mechanism of the system 10 wherein the hinged support members 44 are locked when in the unfolded configuration 50. In this embodiment, the locking mechanism comprises a tab 66 coupled to the frame 16, which engages a member 68 of, for example, the support member 44A to maintain the support member 44A in the unfolded configuration 50. The tab 66 inhibits folding of the support member 44A without sufficient force, thus preventing accidental folding of the support member 44A and adding rigidity to the system 10 when in the unfolded configuration 50.

Figure 5:
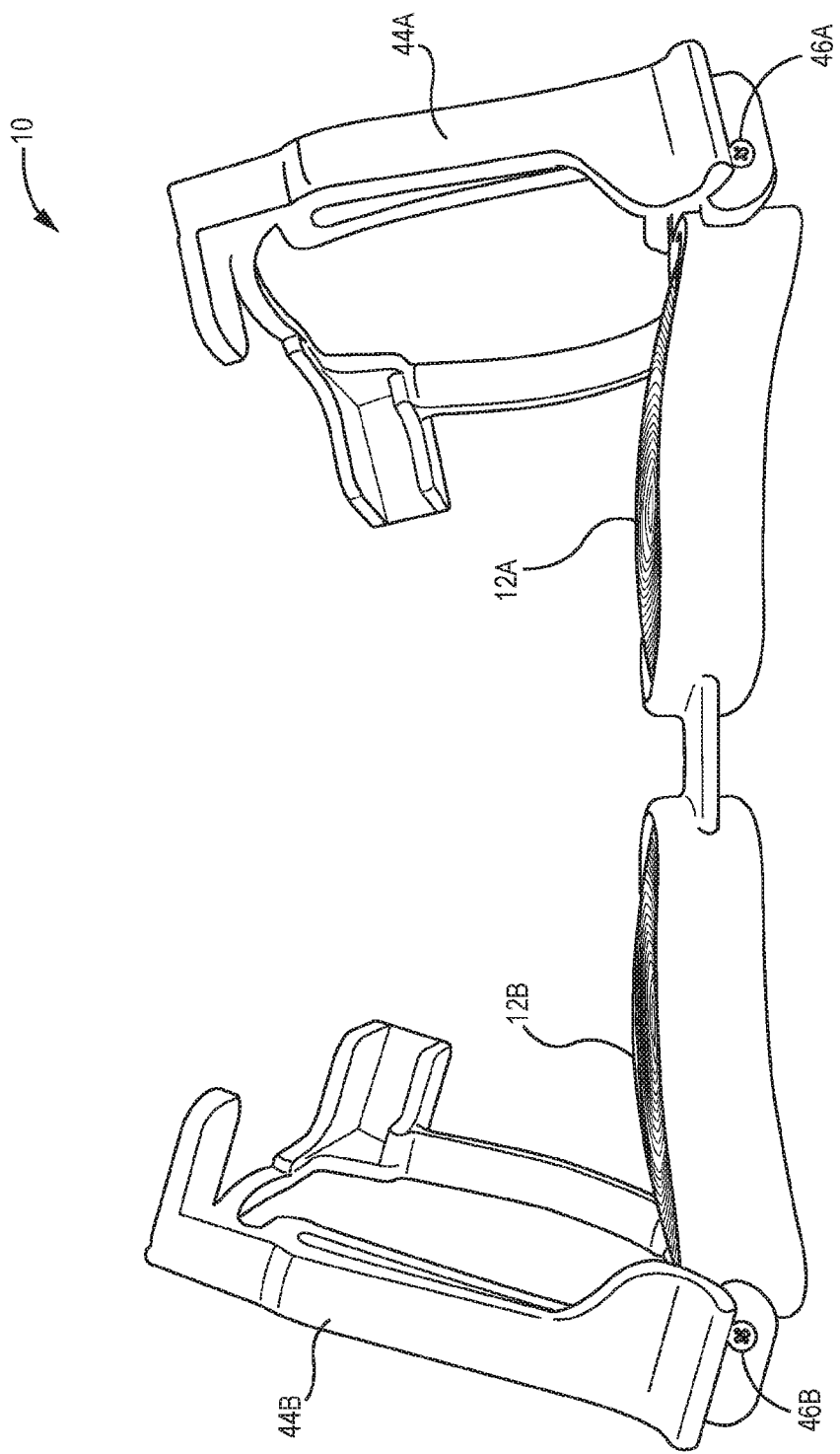
FIG. 5 is a diagram illustrating a top view of the wearable display system in a partially unfolded configuration, according to one embodiment.

FIG. 5 is a diagram illustrating a top view of the system 10 in a partially unfolded configuration, according to one embodiment. Hinges 46A, 46B, respectively, allow support members 44A, 44B, to be swung from the folded configuration 64 to the unfolded configuration 50.

Figure 6:
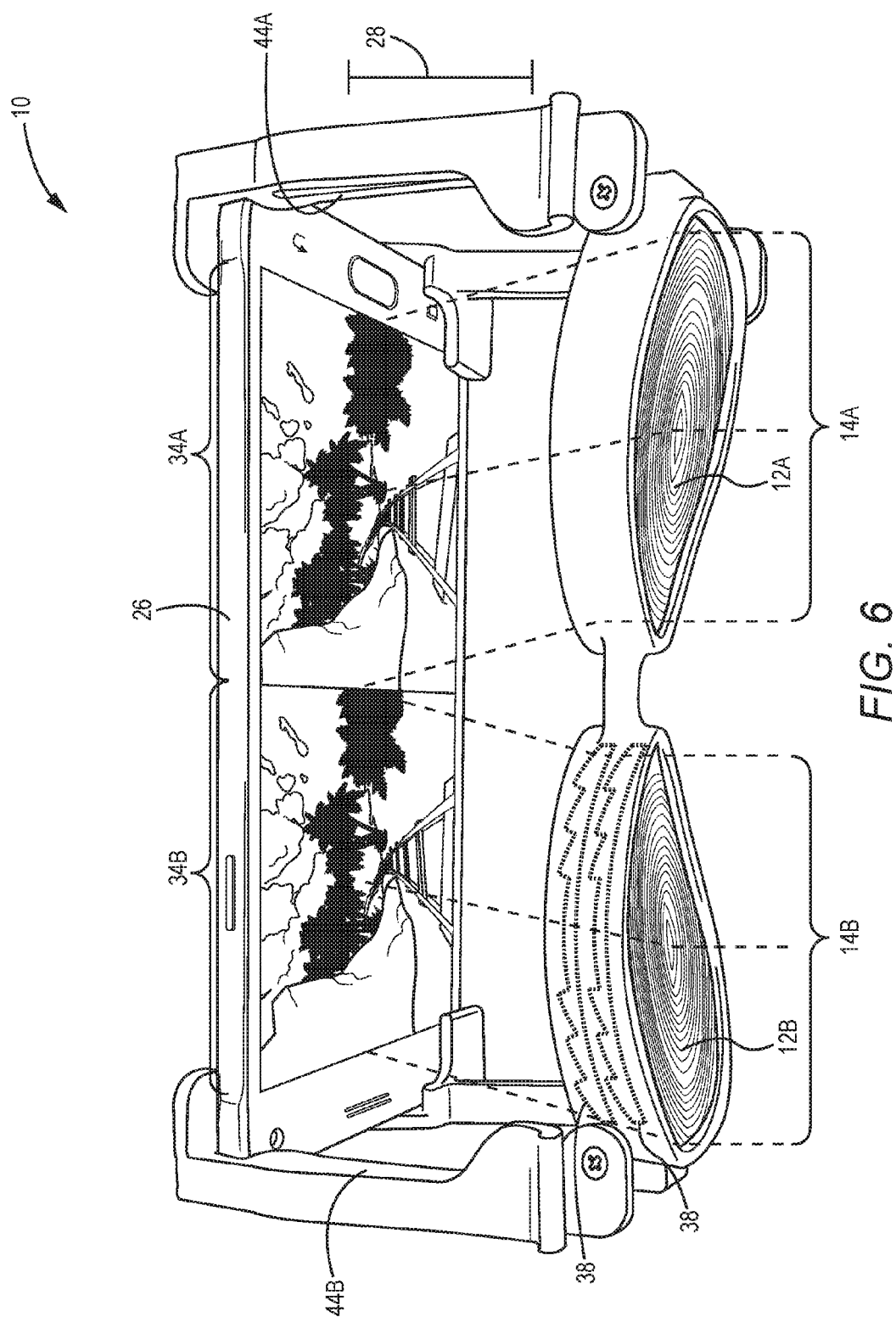
FIG. 6 is a diagram illustrating the wearable display system in the unfolded configuration holding a display device, according to one embodiment.

In some embodiments, different images can be independently provided to each eye 30. In this regard, FIG. 6 is a diagram illustrating the system 10 in the unfolded configuration 50 holding the display device 26. In this view, it can be seen that different portions 34A, 34B of a display 24 have separate specific images for each optical path 14A, 14B, thereby enabling the user 32 to perceive the different portions 34A, 34B of the display 24 together as a 3D VR image. To provide these unique specific images to each eye 30, the display device 26 may operate in a split-screen mode wherein a first portion 34A provides imagery via the Fresnel lens system 36A to a right eye 30A of a user 32 (not shown) and a second portion 34B provides imagery via the Fresnel lens system 36B to the left eye 30B of the user 32 (not shown). The display device 26 is held and maintained with respect to the lens-holding sub-assemblies 18 via the display device grip members 48A, 48B the desired distance 28 within a range of distances suitable for the display application of the system 10.

Figure 7A:
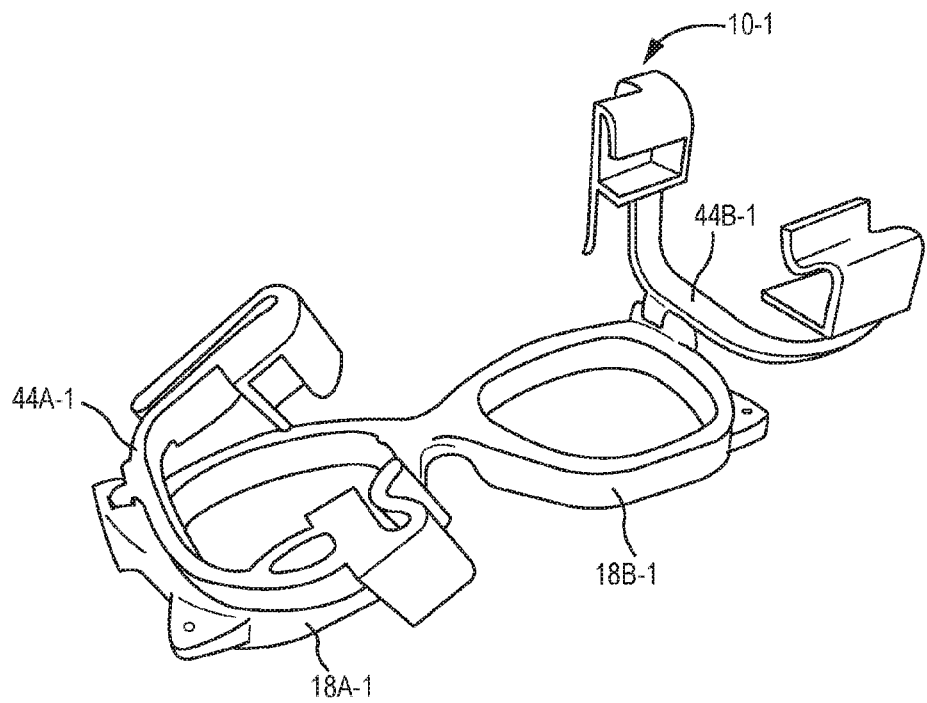
FIG. 7A is a diagram illustrating a wearable display system, according to another embodiment.
Figure 7B:
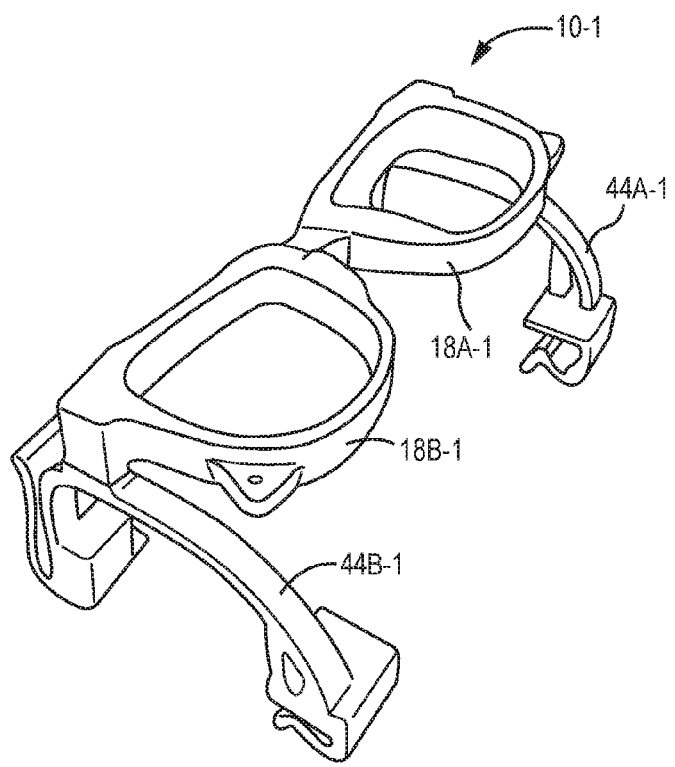
FIG. 7B is a diagram of the wearable display system illustrated in FIG. 7A in an unfolded configuration, according to one embodiment.

FIGS. 7A and 7B are diagrams illustrating a wearable display system 10-1 according to another embodiment. The system 10-1 is substantially similar to the system 10 discussed previously unless otherwise discussed herein. FIG. 7A illustrates the system 10-1 with one support member 44B-1 in a fully extended state and one support member 44A-1 in between a folded configuration and an unfolded configuration. In this embodiment, the support members 44A-1, 44B-1 are shaped to partially conform to the shape of the lens-holding sub-assemblies 18A-1, 18B-1, thereby allowing the system 10-1 to be more easily stored when the system 10-1 is in the folded configuration.

Figure 8:
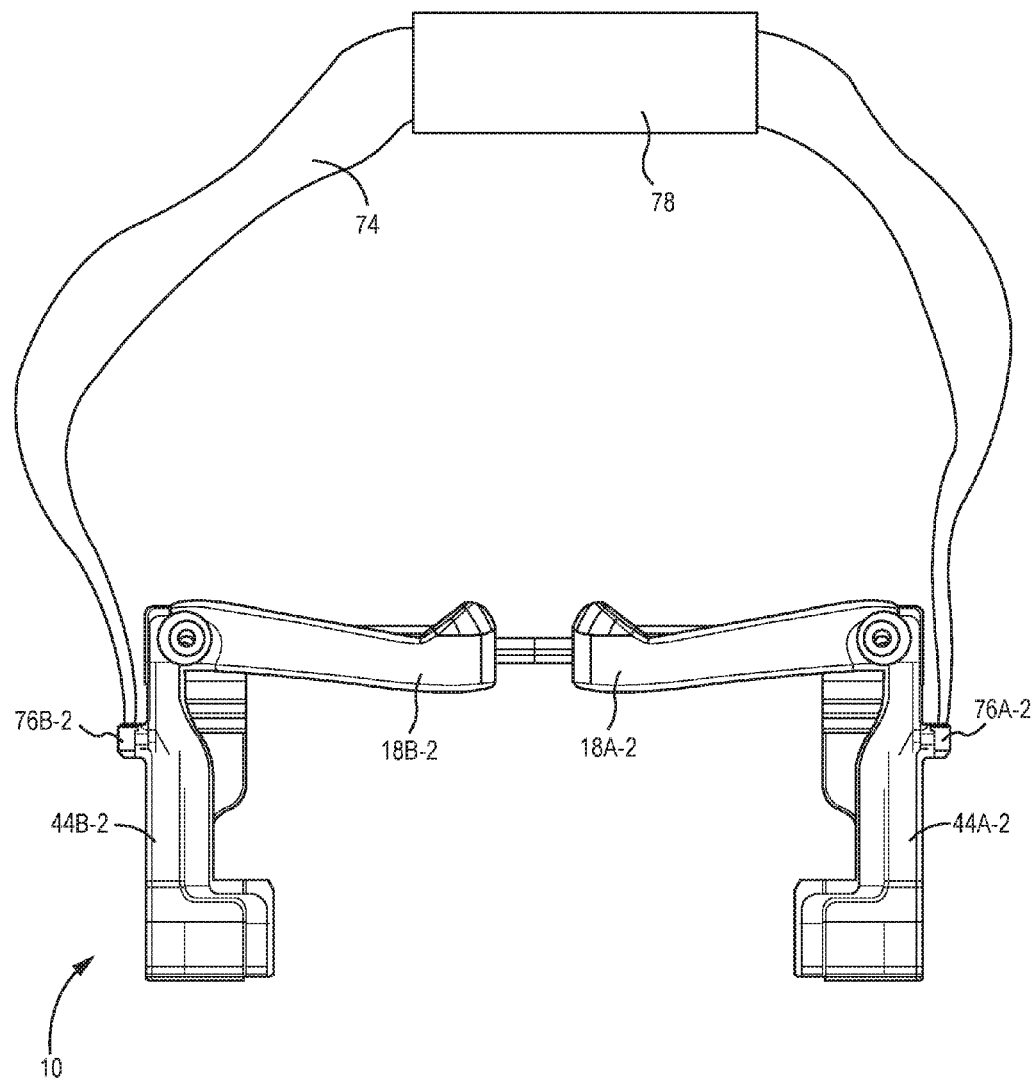
FIG. 8 is a diagram illustrating a bottom view of a wearable display system having additional features for retaining the system on a user's head, in an unfolded configuration, according to an alternate embodiment.

FIG. 8 is a diagram illustrating a bottom view of a wearable display system 10-2 having additional features for retaining the display 24, according to an alternate embodiment. The system 10-2 is substantially similar to the system 10 discussed previously unless otherwise discussed herein.

In this embodiment as well, the system 10-2 includes a head support member 74 configured to extend around a user's head. In this embodiment, the head support member 74 is a strap attached to opposite attachment points 76A-2, 76B-2, on the respective support members 44A-2, 44B-2. It should be understood that additional or alternative attachment points may also be used. The strap may comprise any length, configuration, or material suitable for retaining the system 10-2 on the user's head during use and may also include a pad 78 for comfort.

FIGS. 9A-9C are diagrams illustrating respective rear, side, and top views of a wearable display system having additional features for retaining a display, according to an alternative embodiment. FIGS. 10A-10C are diagrams illustrating respective rear, side, and top views of the wearable display system of FIGS. 9A-9C in a folded configuration. The system 10-3 is substantially similar to the system 10 discussed previously unless otherwise discussed herein. In this embodiment, the components of the system 10-3 may be configured matingly to engage with each other in the folded configuration to make the system 10-3 more compact and portable when the system 10-3 is in the folded configuration.

In this regard, each display device grip member 48A-3, 48B-3 has a respective lower support 80A-3, 80B-3 configured to support the display device 26 against a downward force. In this embodiment, each display device grip member 48A-3, 48B-3 also has a respective upper support 82A-3, 82B-3 configured to support the display device 26 against an upward force. The lower supports 80A-3, 80B-3 and upper supports 82A-3, 82B-3 are separated from each other by a predetermined distance corresponding to a dimension of the display device 26. In this manner, the display device 26 is retained in place while being worn by a user 32, even while the user 32 is engaged in activity that causes the system 10-3 to bounce or shake.

As shown by FIGS. 9B and 9C, the support member 44A-3 also includes a front shield panel 84A-3 extending between the upper support 82A-3 and lower support 80A-3. The support member 44B-3 includes a similar front shield panel 84B-3. The purpose of the front shield panels 84A-3, 84B-3 is to block ambient light and reduce glare on the display 24 of the display device 26 (not shown). In this embodiment, the system 10-3 also has a pair of rear shield panels 86A-3, 86B-3 hingedly connected to the frame 16 and extending rearward towards the eyes 30 of the user 32 when the system 10-3 is in the unfolded configuration and being worn by the user 32 (not shown). The rear shield panels 86A-3, 86B-3 help to block additional ambient light, thereby improving the immersiveness of the system 10-3.

As shown by FIGS. 10A-10C, the front shield panels 84A-3, 84B-3 cover the lens holders 40A-3, 40B-3 from the front when the system 10-3 is in the folded configuration. In addition, the rear shield panels 86A-3, 86B-3 rotate around the opposite side of the lens-holding sub-assemblies 18A-3, 18B-3 to cover the lens holders 40A-3, 40B-3 from the rear when the system 10-3 is in the folded configuration. In this manner, the front shield panels 84A-3, 84B-3 and rear shield panels 86A-3, 86B-3 protect the lenses 38 (not shown) from being damaged during storage or transport. In this embodiment, the front shield panel 84A-3 and rear shield panel 86A-3 rotate about a common hinge 46A-3, and front shield panel 84B-3 and rear shield panel 86B-3 also rotate about a common hinge 46B-3, but it should be understood that additional hinges may be employed in some embodiments.

Figure 11:
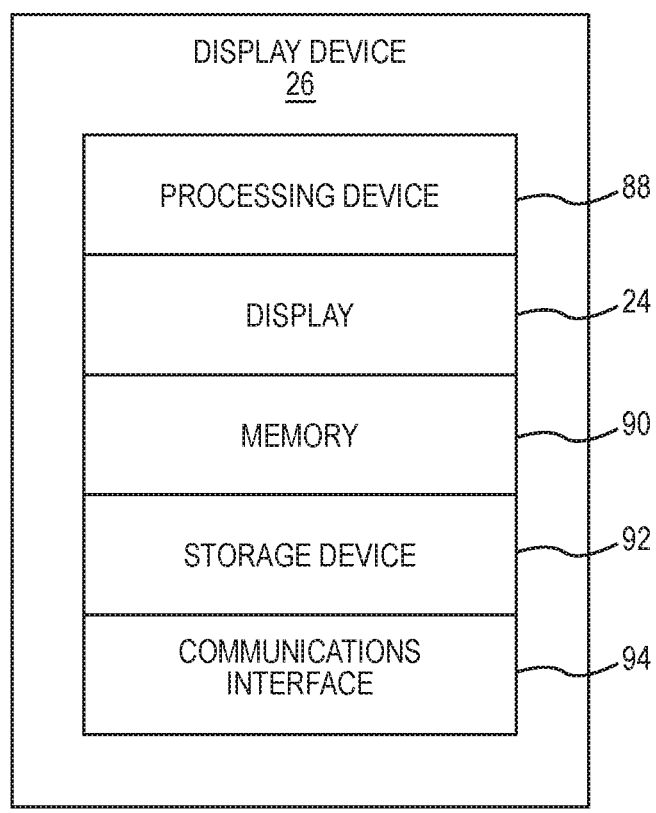
FIG. 11 is a block diagram illustrating a display device, according to one embodiment.

The display device 26 may comprise any suitable computing device including, by way of non-limiting example, a smart phone, such as an Apple iPhone or Android-based smart phone, or a computing tablet. In this regard, FIG. 11 is a block diagram illustrating the display device 26 according to one embodiment. The display device 26 includes a processing device 88, which comprises a processor or microprocessor. The display device 26 further includes a display 24 on which imagery can be presented. As discussed previously, in some embodiments, the display 24 generates a split-screen display such that different imagery is presented to each eye of a user. The processing device 88 is coupled to a memory 90, in which, in one embodiment, software instructions may be stored to provide some or all of the functionality described herein. The display device 26 may include a storage device 92 and a communications interface 94.

In some embodiments, the display device 26 may be programmed in accordance with certain development tools such as, by way of non-limiting example, Cardboard, Unity, Unreal, and/or Unigine development tools. In some embodiments, a distortion may be provided to the imagery that is displayed on the display 24 such that the imagery matches what the user would see in the real world. Thus, distorted imagery is provided to the display 24, and the lens sub-assemblies 12 fix the imagery for viewing by the user.

The systems 10 to 10-3 provide a wide field of view (FOV) that is clear and in focus throughout the FOV. The systems 10 to 10-3 have a large exit pupil and thus do not have to be perfectly centered on the eyes of the user. The systems 10 to 10-3 can be used by users who wear glasses without any discomfort. When in a folded configuration, the systems 10 to 10-3 are relatively thin and fit easily within a pocket or purse.

The systems 10 to 10-3 may present games, including 3D games, movies, or the like. The display device 26 may include, in some embodiments, an accelerometer or other motion-sensitive device such that movements of the user's head can determine which portions of a virtual world are presented to the user. Thus, the user, simply by turning his head, can view different portions of the virtual world.

Figure 12:
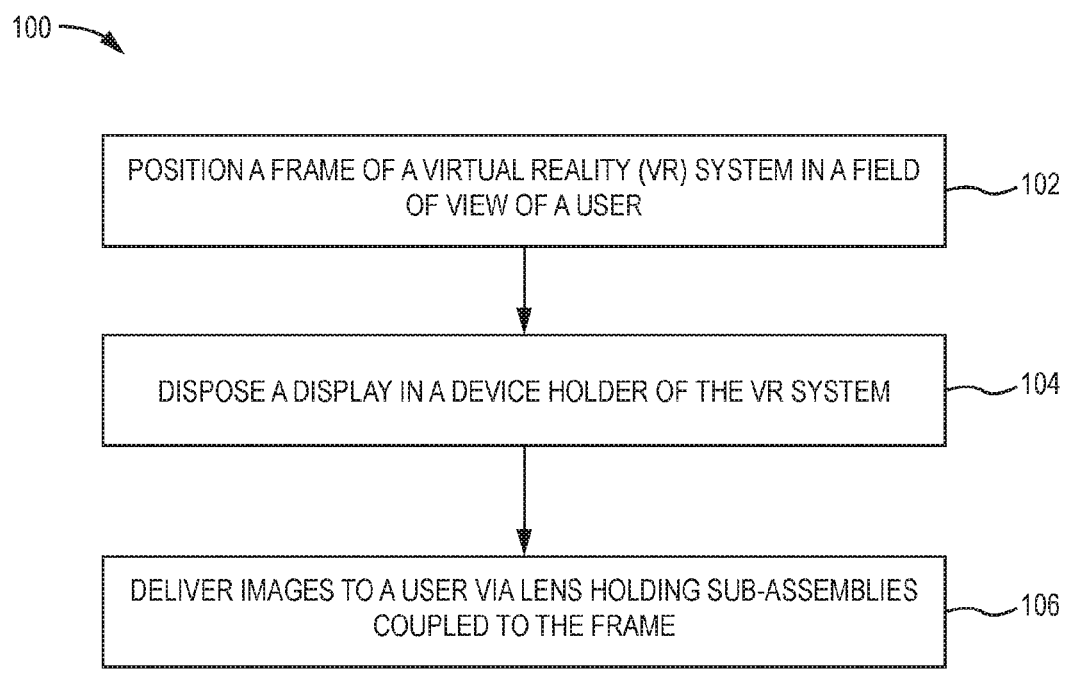
FIG. 12 is a flowchart illustrating a method of using a display system according to the disclosed embodiments.

FIG. 12 is a flowchart illustrating a method 100 of using a display system according to the disclosed embodiments. The method 100 comprises positioning a frame, such as, for example, frame 16 with lens-holding sub-assemblies 18, of a wearable display system in a field of view of a user (block 102). The method 100 further comprises disposing a display of a device, such as display 24, in a device holder of the wearable display system (block 104), such that the display is maintained within a predetermined range of distances with respect to the first lens sub-assembly and the second lens sub-assembly, and the display is maintained within a predetermined range of angles with respect to the first lens sub-assembly and the second lens sub-assembly. The method further comprises delivering images to a user wearing the system via the lens-holding sub-assemblies (block 106).

Those skilled in the art will recognize improvements and modifications to the preferred embodiments of the disclosure. All such improvements and modifications are considered within the scope of the concepts disclosed herein and the claims that follow.

What is claimed is:

1. A wearable display system comprising:
   a first lens sub-assembly defining a first optical path;
   a second lens sub-assembly defining a second optical path; and
   a frame comprising:
      a lens-holding sub-assembly comprising:
         a first lens holder configured to hold the first lens sub-assembly;
         a second lens holder configured to hold the second lens sub-assembly; and
         a bridge coupled between the first lens holder and the second lens holder; and
      a device holder comprising:
         a first support member hingedly coupled to the first lens holder, the first support member comprising a first device grip member configured to releasably grip a first portion of a device to maintain a display of the device in the first optical path and in the second optical path; and
         a second support member hingedly coupled to the second lens holder, the second support member comprising a second device grip member configured to releasably grip a second portion of the device to maintain the display of the device in the first optical path and in the second optical path;
      wherein the device holder is configured to:
         maintain a display of the device in the first optical path and in the second optical path,
         maintain the display within a predetermined range of distances with respect to the first lens sub-assembly and the second lens sub-assembly, and
         maintain the display within a predetermined range of angles with respect to the first lens sub-assembly and the second lens sub-assembly.

2. The wearable display system of claim 1 wherein the first lens sub-assembly comprises a first Fresnel lens defining the first optical path, and the second lens sub-assembly comprises a second Fresnel lens defining the second optical path.

3. The wearable display system of claim 2 wherein the first Fresnel lens comprises a plurality of first Fresnel lenses defining the first optical path, and the second Fresnel lens comprises a plurality of second Fresnel lenses defining the second optical path.

4. The wearable display system of claim 3 wherein the plurality of first Fresnel lenses is configured to refract light twice as light passes through at least two first Fresnel lenses along the first optical path, and
   the plurality of second Fresnel lenses is configured to refract light twice as light passes through the at least two second Fresnel lenses along the second optical path.

5. The wearable display system of claim 1, wherein the device holder is configured to maintain the display in the first optical path and in the second optical path such that:
   a first portion of the display is maintained in the first optical path, and
   a second portion of the display is maintained in the second optical path,
   wherein the first portion of the display does not overlap with the second portion of the display.

6. The wearable display system of claim 5 wherein the device holder has a folded configuration and an unfolded configuration, wherein in the folded configuration each of the lens-holding sub-assembly, the first support member, and the second support member are substantially parallel to each other, and wherein in the unfolded configuration the first support member and the second support member are substantially parallel to each other and are substantially perpendicular to the lens-holding sub-assembly.

7. The wearable display system of claim 6 wherein the frame is configured to be worn by a user such that, while the frame is being worn, the lens-holding arrangement is the predetermined range of distances from a first eye and a second eye of the user, wherein the first eye of the user is in the first optical path, and the second eye of the user is in the second optical path.

8. The wearable display system of claim 7 wherein the frame further comprises a peak attachment member configured to be coupled to a peak of a hat while the frame is being worn.

9. The wearable display system of claim 8 wherein the peak attachment member comprises a first arm and a second arm coupled to the device holder.

10. The wearable display system of claim 7, wherein the frame further comprises a head support member configured to extend around opposite sides of a head of the user while the frame is being worn to secure the frame to the head of the user.

11. The wearable display system of claim 10, wherein the frame further comprises a strap configured to extend around the head of the user while the frame is being worn to secure the frame to the head of the user.

12. The wearable display system of claim 5, wherein the first device grip member comprises a first lower support and the second device grip member comprises a second lower support, the first lower support and the second lower support configured to support the display device against a downward force.

13. The wearable display system of claim 12, wherein the first device grip member comprises a first upper support and the second device grip member comprises a second upper support, the first upper support and the second upper support configured to support the display device against an upward force.

14. A method of using a wearable display system comprising:
  positioning a frame of the wearable display system in a field of view of a user, the frame comprising:
    a device holder comprising:
      a first support member comprising a first device grip member configured to releasably grip a first portion of a device to maintain a display of the device in the first optical path and in the second optical path; and
      a second support member comprising a second device grip member configured to releasably grip a second portion of the device to maintain the display of the device in the first optical path and in the second optical path;
    a lens-holding sub-assembly comprising:
      a first lens holder holding a first lens sub-assembly, the first lens holder hingedly coupled to the first support member;
      a second lens holder holding a second lens sub-assembly, the second lens holder hingedly coupled to the second support member; and
      a bridge coupled between the first lens holder and the second lens holder;
  disposing a device comprising a display in the device holder of the wearable display system, wherein
    the display is maintained within a predetermined range of distances with respect to the first lens sub-assembly and the second lens sub-assembly,
    the display is maintained within a predetermined range of angles with respect to the first lens sub-assembly and the second lens sub-assembly,
    the first lens sub-assembly defines a first optical path between a first eye of the user and the display; and
    the second lens sub-assembly defines a second optical path between a second eye of the user and the display.

15. The method of claim 14, wherein the first lens sub-assembly comprises a first Fresnel lens defining the first optical path, and the second lens sub-assembly comprises a second Fresnel lens defining the second optical path.

16. The method of claim 15, wherein the first Fresnel lens comprises a plurality of first Fresnel lenses defining the first optical path, and the second Fresnel lens comprises a plurality of second Fresnel lenses defining the second optical path,
  wherein light along the first optical path is refracted at least twice by the plurality of first Fresnel lenses, and light along the second optical path is refracted at least twice by the plurality of second Fresnel lenses.

17. The method of claim 14, wherein disposing the display of the device in the device holder further comprises:
  maintaining a first portion of the display in the first optical path, and
  maintaining a second portion of the display in the second optical path,
  wherein the first portion of the display does not overlap with the second portion of the display.

18. A wearable display system comprising:
  a first lens sub-assembly defining a first optical path;
  a second lens sub-assembly defining a second optical path; and
  a frame comprising:
    a lens-holding sub-assembly comprising:
      a first lens holder configured to hold the first lens sub-assembly;
      a second lens holder configured to hold the second lens sub-assembly; and
      a bridge coupled between the first lens holder and the second lens holder; and
    a device holder comprising at least one grip member hingedly coupled to at least one of the first lens holder or the second lens holder, the grip member forming at least one slot configured to receive a device upon insertion of the device into the at least one slot and release the device upon removal of the device from the at least one slot;
  wherein the device holder is configured to:
    maintain a display of the device in the first optical path and in the second optical path,
    maintain the display within a predetermined range of distances with respect to the first lens sub-assembly and the second lens sub-assembly, and
    maintain the display within a predetermined range of angles with respect to the first lens sub-assembly and the second lens sub-assembly.

* * * * *